(12) United States Patent
Wei et al.

(10) Patent No.: US 11,491,830 B2
(45) Date of Patent: Nov. 8, 2022

(54) SYSTEM AND METHOD FOR HARVESTING ENERGY FOR AN ELECTRONIC DEVICE, AND A TIRE CONFIGURED FOR USE WITH THE SAME

(71) Applicant: BRIDGESTONE AMERICAS TIRE OPERATIONS, LLC, Nashville, TN (US)

(72) Inventors: Terence E. Wei, Copley, OH (US); Jason R. Barr, Akron, OH (US); Thomas A. Sams, Hartville, OH (US); Srikrishna Doraiswamy, Akron, OH (US); Timothy J. Hanchin, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 17/604,205

(22) PCT Filed: Mar. 19, 2020

(86) PCT No.: PCT/US2020/023478
§ 371 (c)(1),
(2) Date: Oct. 15, 2021

(87) PCT Pub. No.: WO2020/214320
PCT Pub. Date: Oct. 22, 2020

(65) Prior Publication Data
US 2022/0144022 A1 May 12, 2022

Related U.S. Application Data

(60) Provisional application No. 62/835,720, filed on Apr. 18, 2019.

(51) Int. Cl.
*B60C 23/04* (2006.01)

(52) U.S. Cl.
CPC ........ *B60C 23/041* (2013.01); *B60C 23/0493* (2013.01)

(58) Field of Classification Search
CPC .. G01M 17/02; G01M 17/022; G01M 17/027; G01M 17/021; G01M 17/024;
(Continued)

(56) References Cited

U.S. PATENT DOCUMENTS

| 5,513,525 A | 5/1996 | Schurmann |
| 6,470,933 B1 | 10/2002 | Volpi |

(Continued)

FOREIGN PATENT DOCUMENTS

| DE | 102007053153 A1 | 5/2009 |
| DE | 102016215584 A1 | 2/2018 |

(Continued)

OTHER PUBLICATIONS

International Search Report and Written Opinion dated Jul. 17, 2020 in related PCT App No. PCT/US2020/023478.

*Primary Examiner* — Andre J Allen

(57) ABSTRACT

A system for powering an electronic device within a tire is provided, the system comprising: a generator; an electrically conductive wheel coated in a non-conductive coating, the wheel including rim lips, wherein one of the rim lips includes a conductive area; the tire including bead portions, sidewalls, shoulders, a tread oriented in a tread region, and an inner surface; a conductive element extending from a bead portion, and in contact with the inner surface; an electronic device within the vehicle tire; and a ground path extending through a thickness of the vehicle tire from the inner surface to an exterior surface in a contact patch of the tread; wherein the generator is electrically connected to the electrically conductive wheel; wherein the electronic device is electrically connected to the conductive element and the (Continued)

ground path; and wherein the conducive element contacts the conductive area.

18 Claims, 20 Drawing Sheets

(58) Field of Classification Search
CPC .............. G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 23/0471; B60C 11/318; B60C 23/0459; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC ................................................ 73/146–146.8
See application file for complete search history.

(56) References Cited

U.S. PATENT DOCUMENTS 7,549,327 B2  6/2009  Breed
8,868,270 B2  10/2014  Takahashi

(56) References Cited

U.S. PATENT DOCUMENTS

| | | | |
|---|---|---|---|
| 9,027,681 | B2 | 5/2015 | Biderman et al. |
| 9,296,263 | B2 | 3/2016 | Muthukumar |
| 9,463,782 | B2 | 10/2016 | Kikawa et al. |
| 10,035,386 | B2 | 7/2018 | Atsumi et al. |
| 10,076,960 | B2 | 9/2018 | Ricci |
| 2001/0008083 | A1 | 7/2001 | Brown |
| 2003/0209063 | A1* | 11/2003 | Adamson ............... B60K 25/08 73/146 |
| 2004/0211250 | A1* | 10/2004 | Adamson ............... B60K 25/08 73/146 |
| 2005/0110277 | A1* | 5/2005 | Adamson ................. F03G 7/08 290/1 R |
| 2006/0243043 | A1* | 11/2006 | Breed .................. B60C 23/041 73/146 |
| 2009/0211353 | A1* | 8/2009 | Gao .................... H01L 41/1134 310/329 |
| 2015/0217643 | A1 | 8/2015 | Lee et al. |
| 2018/0099675 | A1 | 4/2018 | Boisvert et al. |
| 2018/0257442 | A1 | 9/2018 | Elian et al. |
| 2018/0257656 | A1 | 9/2018 | Zhao et al. |
| 2021/0028725 | A1* | 1/2021 | Griswold ................. H02N 2/18 |

FOREIGN PATENT DOCUMENTS

| | | | | |
|---|---|---|---|---|
| DE | 102016223298 | A1 | 5/2018 | |
| JP | 2005233968 | A | 9/2005 | |
| JP | 2013203312 | A | 10/2013 | |
| WO | 2005067073 | A1 | 7/2005 | |
| WO | WO-2011051800 | A1 * | 5/2011 | ........... B60C 23/041 |
| WO | 2018028850 | A1 | 2/2018 | |
| WO | 2018050564 | A1 | 3/2018 | |
| WO | 2018095615 | A1 | 5/2018 | |
| WO | WO-2020214318 | A1 * | 10/2020 | ........... B60C 23/041 |

\* cited by examiner

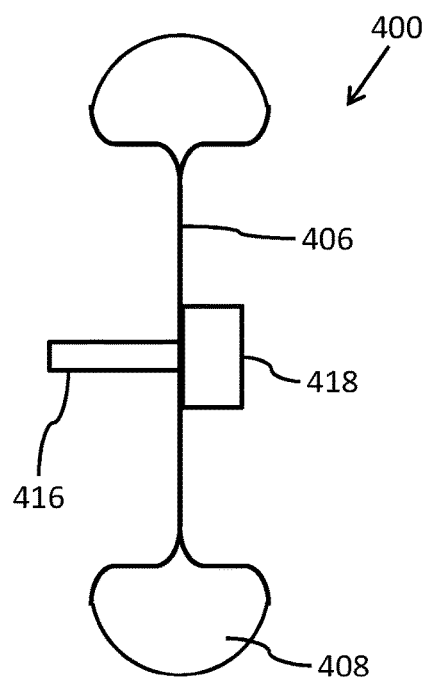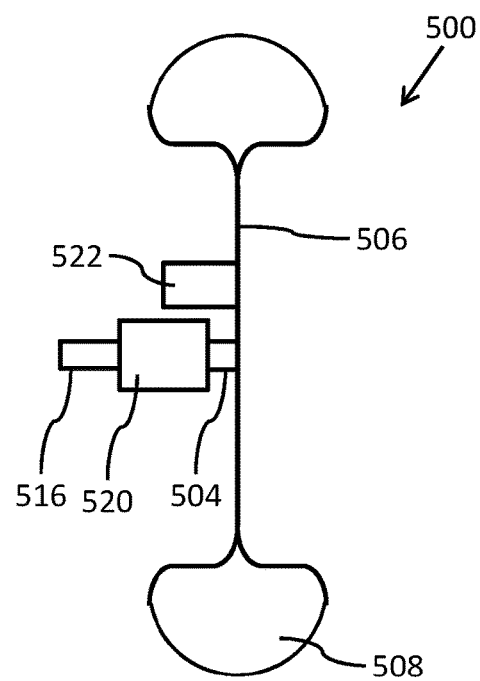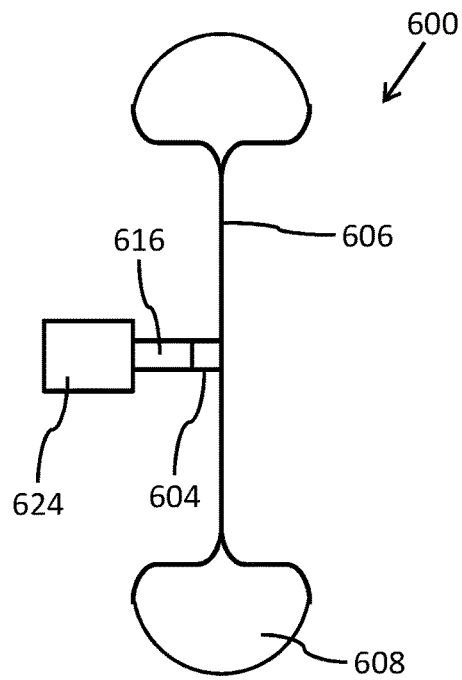

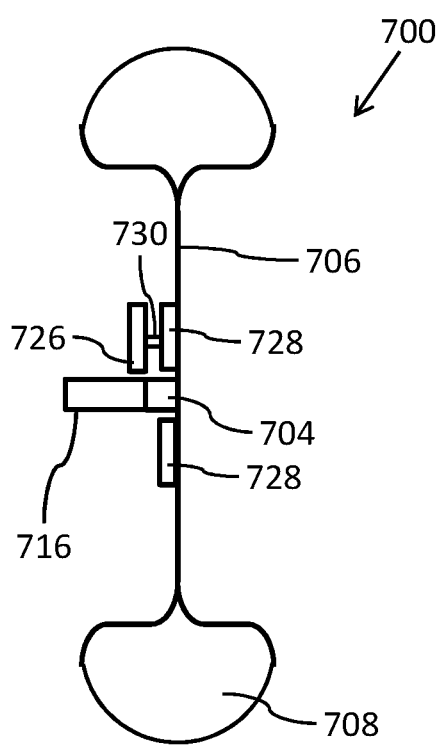
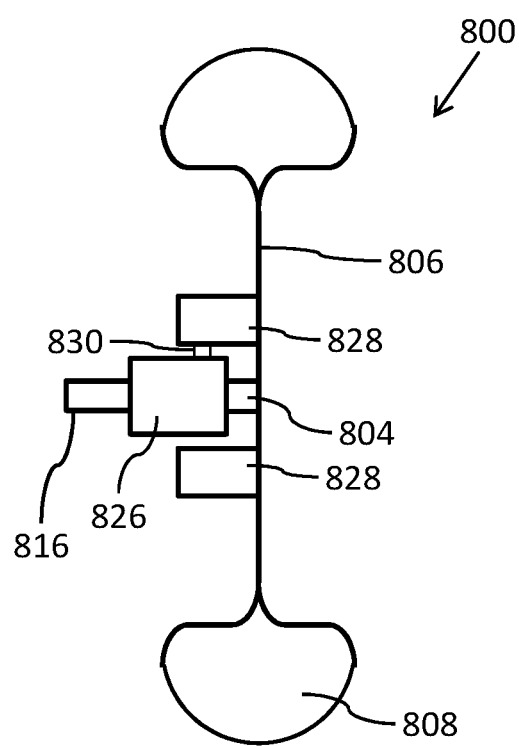
FIG. 7          FIG. 8

SYSTEM AND METHOD FOR HARVESTING ENERGY FOR AN ELECTRONIC DEVICE, AND A TIRE CONFIGURED FOR USE WITH THE SAME

BACKGROUND

It has become increasingly common to place electronic sensors, and other electronic devices, within vehicle tires and wheels. For example, these may include sensors to monitor tire pressure, tire temperature, the presence of a foreign object, or the like. Providing electric power to these electronic sensors and devices is often difficult. First, batteries within the tire/wheel configured to power these objects typically have a shorter-than-desired life, or are too large and heavy to be practically installed within the tire/wheel. Second, it is difficult to run wires from a power source external to the tire and wheel assembly because the tire and wheel assembly rotates relative to the vehicle, and the tire requires an air-tight seal with the wheel to maintain inflation pressure within the tire.

However, many vehicles, including hybrid and electric vehicles, generate power at or near the wheels of the vehicle. At least a portion of this generated power may be directed to the aforementioned electronic sensors or other electronic devices within the tire. One example of such power generation is the regenerative braking within vehicles to capture energy while decelerating. Typically, these vehicles utilize some of the power generated in regenerative braking to charge the vehicle batteries, but not all of the energy can be used to charge the batteries due to limits to the rate of charging the batteries. As a result, the energy generated via regenerative braking that exceeds the charging rate of the vehicle's battery is often bled off through large resistors, and thus wasted. Rather than waste this excess energy, one may be able to harness it and direct it to the aforementioned electronic sensors or other electronic devices contained within the vehicle's wheel or tire.

What is needed is a system and method for directing energy (excess or otherwise) to an electronic sensor or other electronic device contained within the vehicle's wheel or tire.

SUMMARY

In one embodiment, a system for powering an electronic device within a vehicle tire is provided, the system comprising: an electrical energy generator; an electrically conductive vehicle wheel coated in a non-conductive coating, the vehicle wheel including a pair of rim lips, wherein at least one of the pair of rim lips includes a conductive area; the vehicle tire including a pair of bead portions, a pair of sidewalls, a pair of shoulders, a tread oriented in a tread region, and an inner surface; at least one conductive element extending from at least one of the pair of bead portions, and in contact with the inner surface along at least one of the pair of sidewalls, along at least one of the pair of shoulders, and terminating in the tread region; at least one electronic device within the vehicle tire; and at least one ground path extending through a thickness of the vehicle tire from the inner surface to an exterior surface in a contact patch of the tread; wherein the electrical energy generator is electrically connected to the electrically conductive vehicle wheel; wherein the at least one electronic device is electrically connected to the at least one conductive element and the at least one ground path; and wherein the at least one conducive element contacts the conductive area.

In another embodiment, a system for powering an electronic device within a vehicle tire is provided, the system comprising: an electrical energy generator; an electrically conductive vehicle wheel coated in a non-conductive coating, the vehicle wheel including a pair of rim lips, wherein at least one of the pair of rim lips includes a conductive area; the vehicle tire including a pair of bead portions, a pair of sidewalls, a pair of shoulders, a tread oriented in a tread region, an inner surface, and a metallic cord oriented within an interior of the tire; at least one conductive element extending from at least one of the pair of bead portions and piercing into the interior of the tire and electrically connecting to the metallic cord; at least one electronic device within the vehicle tire; and at least one ground path extending through a thickness of the vehicle tire from the inner surface to an exterior surface in a contact patch of the tread; wherein the electrical energy generator is electrically connected to the electrically conductive vehicle wheel; wherein the at least one electronic device is electrically connected to the metallic cord and the at least one ground path; and wherein the at least one conducive element contacts the conductive area.

BRIEF DESCRIPTION OF THE DRAWINGS

The accompanying figures, which are incorporated in and constitute a part of the specification, illustrate various example embodiments, and are used merely to illustrate various example embodiments. In the figures, like elements bear like reference numerals.

FIG. 4 illustrates a sectional view of a system 400 for harvesting energy for an electronic device in a tire 408.

FIG. 5 illustrates a sectional view of a system 500 for harvesting energy for an electronic device in a tire 508.

FIG. 6 illustrates a sectional view of a system 600 for harvesting energy for an electronic device in a tire 608.

FIG. 7 illustrates a sectional view of a system 700 for harvesting energy for an electronic device in a tire 708.

FIG. 8 illustrates a sectional view of a system 800 for harvesting energy for an electronic device in a tire 808.

DETAILED DESCRIPTION

Figure 1A:
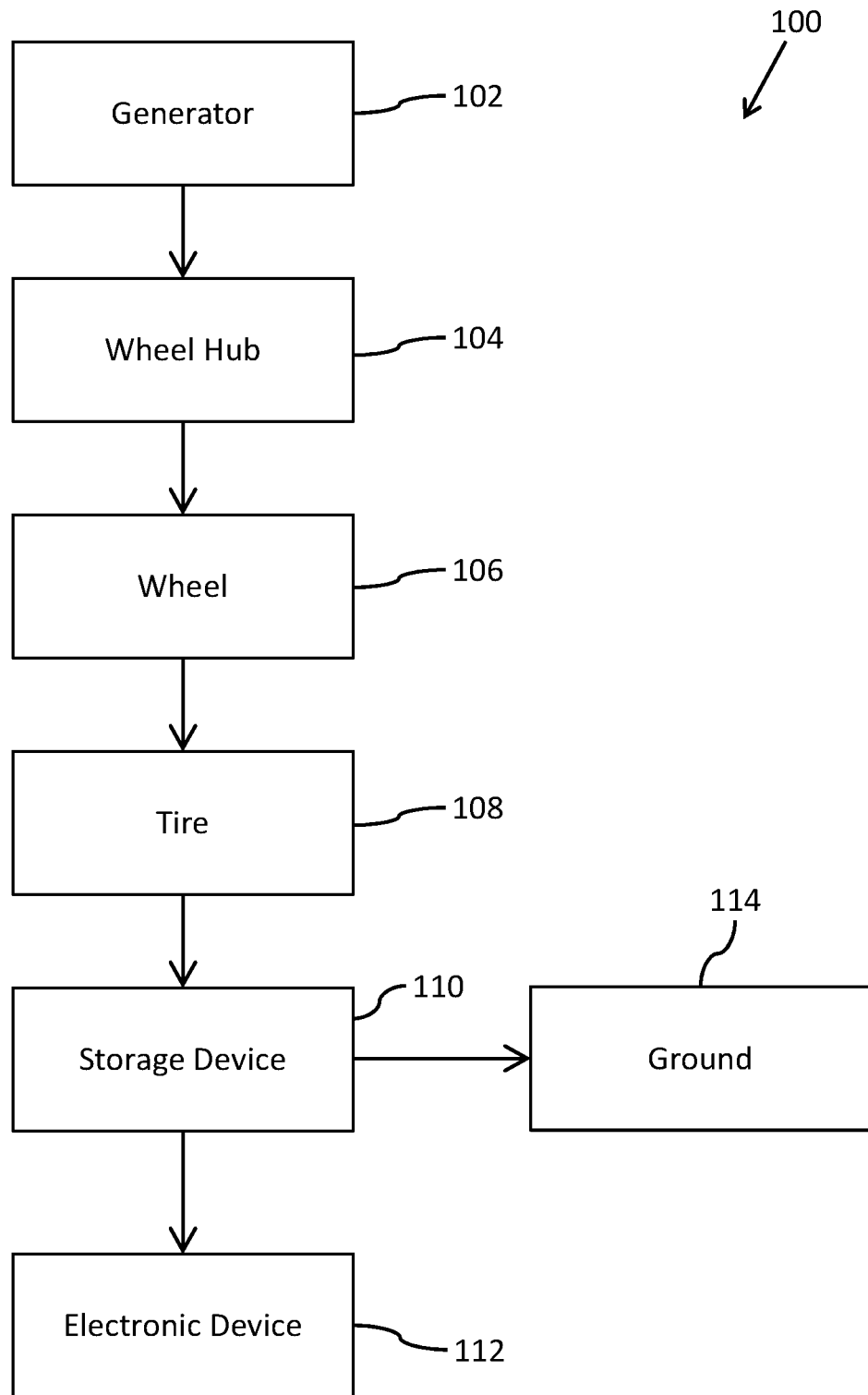
FIG. 1A illustrates a schematic showing a flow of energy in a system 100 for harvesting energy for an electronic device 112, including a wheel hub 104.
Figure 1B:
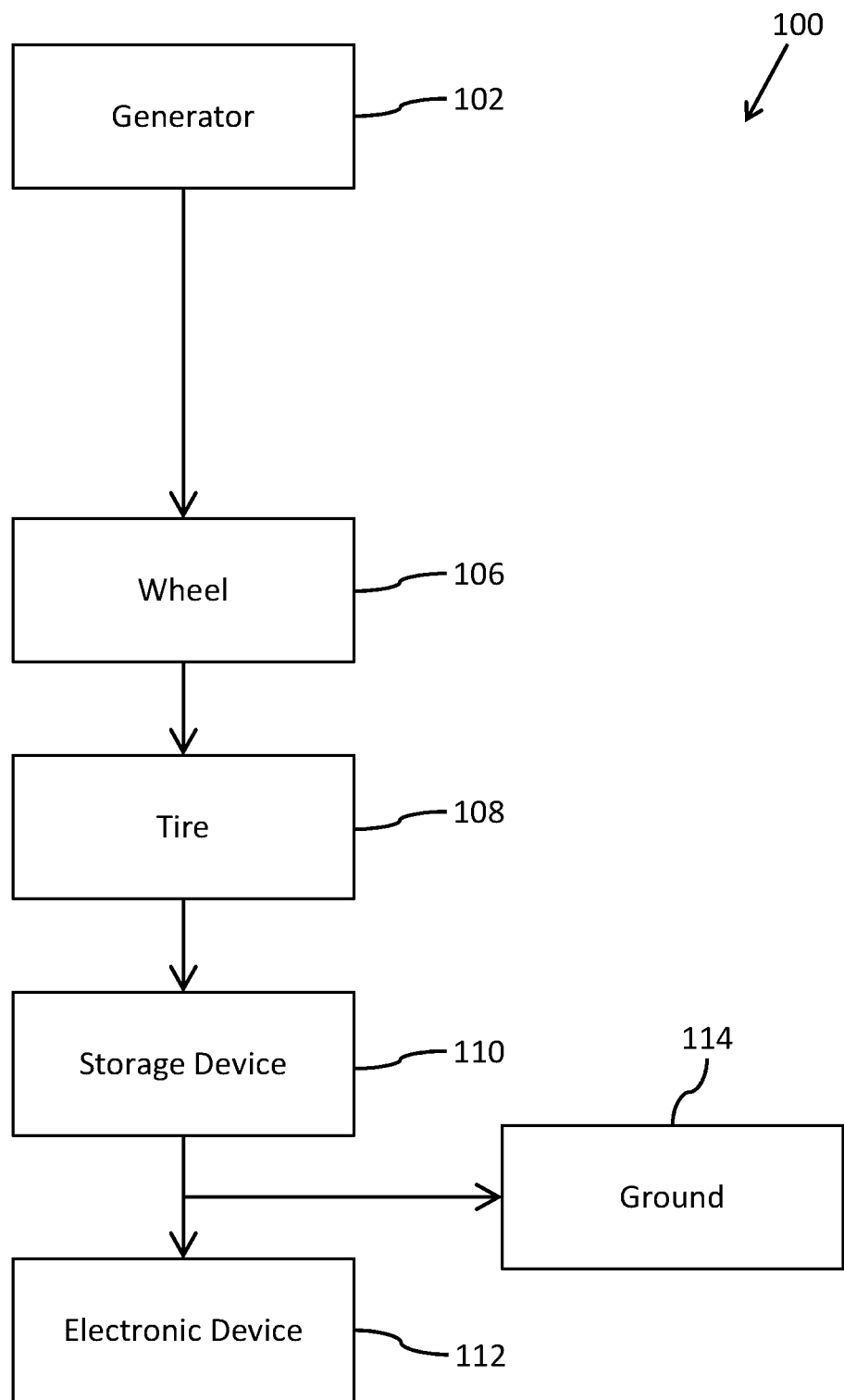
FIG. 1B illustrates a schematic showing a flow of energy in a system 100 for harvesting energy for an electronic device 112.

FIGS. 1A and 1B illustrate a schematic showing a flow of energy in a system 100 for harvesting energy for an electronic device 112. System 100 includes an electrical energy generator 102.

Generator 102 may be any device capable of converting mechanical energy into electrical energy. Generator 102 may be a regenerative braking motor, which may essentially be a DC motor that creates resistance to rotating its motor shaft when run in reverse (during braking), which reverse rotation generates electrical power in the motor. Generator 102 may include a coil and a magnet, one of which is oriented on a wheel hub 104, wheel 106, or tire 108 as further described below. By rotating or otherwise moving an electric coil relative to a magnet, an electrical current may be created in the coil, which current may be directed to an electrical device or electrical storage component.

Generator 102 may be operatively connected to wheel hub 104 (see FIG. 1A). Wheel hub 104 may be an assembly, including a hub unit and hub bearing, which for ease of reference herein is collectively referred to as a wheel hub.

It should be understood that a wheel hub 104 for a drive wheel may be different from a non-drive wheel. That is, a wheel hub for a drive wheel may be configured to bolt to the wheel on one end, and attach to the end of an axle on the other end, with the axle and the wheel rotating together with a 1:1 ratio. A bearing may be oriented on the wheel hub and connected to a holding bracket on a vehicle chassis, which fixes the wheel to the chassis to maintain the wheel within its desired motion constraints. Where generator 102 is a regenerative breaking motor, that wheel is likely a drive wheel and the axle may be a motor shaft (in the case of a direct drive system) or an output shaft of a transmission (in the case of a gear drive system).

On the other hand, a wheel hub for a non-drive wheel may attach to a wheel on one side, but may not attach to a drive axle. Rather, the wheel hub may attach to a generator configured to generate electricity by the rotation of the wheel, or be operatively connected to a device that generates electricity (for example, a wheel hub may include a coil or magnet that rotates or otherwise moves relative to a corresponding magnet or coil fixed in a stationary position on the vehicle chassis or body adjacent thereto). For a non-drive wheel, a bearing in the wheel hub may be connected to a holding bracket on a vehicle chassis as described above.

Alternatively, as illustrated in FIG. 1B, a generator including a coil and magnet rotating or otherwise moving relative to one another, may be fixed directly to the wheel 106 in order to generate electricity to be passed directly into wheel 106.

In both FIGS. 1A and 1B, system 100 directs a flow of current through vehicle components. That is, electricity is generated in generator 102, directed into hub 104, and then into wheel 106 (FIG. 1A). Alternatively, electricity is generated in generator 102, and directed directly into wheel 106, bypassing hub 104 (FIG. 1B). In either version of system 100, the components shown in system 100 are electrically conductive or have been modified to be electrically conductive. That is, hub 104 is metallic and via its interface with the vehicle's axle and the vehicle's wheel, electricity can be passed through hub 104 into wheel 106. Wheel 106 is likewise metallic, and as such, electricity can be passed through wheel 106 into a tire 108. Tires are typically formed from a plurality of materials, much of which is a rubber and often electrically insulative. However, as described further below, tire 108 can be modified to permit the passage of electrical current through or along tire 108. The electrical current, having been passed from generator 102 and ultimately through wheel 106 (whether through or around hub 104) and through or along a portion of tire 108, is directed to an electricity storage device 110.

The electricity of the current may be stored in electricity storage device 110. As electricity storage device 110 has a regular source of electrical current to maintain or restore its power capacity, device 110 may be smaller and lighter than an electricity storage device utilized in systems that do not provide electrical current to the electricity storage device, but rather require the electricity storage device to maintain a power capacity for a longer duration, such as between specified vehicle maintenance intervals.

Storage device 110 may be any of a variety of devices configured to store electricity until it is desired to be discharged. For example, storage device 110 may be a battery, a capacitor, and the like.

Storage device 110 may be a battery operating at any of a variety of voltages as required to power electronic device 112. For example, storage device 110 may be a battery having a voltage between about 3 V and 5 V. Storage device 110 may be a battery having any of a variety of storage capacities as required to power electronic device 112. For example, storage device 110 may be a battery having a storage capacity of about 100 mAh.

Storage device 110 may provide electricity to electronic device 112. Electronic device 112 may be any of a variety of electronic devices that may be desirable within tire 108. For example, electronic device 112 may be a sensor to monitor at least one of: tire pressure, tire temperature, the presence of a foreign object in tire 108, or the like. Electronic device 112 may have any of a variety of voltage and/or wattage requirements to operate. For example, electronic device 112 may require wattage input on the order of 10 s of watts. Electronic device 112 may require wattage input of less than 100 watts. Electronic device 112 may require wattage input of less than 75 watts. Electronic device 112 may require wattage input of less than 50 watts. Electronic device 112 may require wattage input of less than 25 watts.

During charging of storage device 110 with electricity, any excess electricity that either exceeds the storage limit of storage device 110, or exceeds the charging rate of storage device 110, is directed out of tire 108 to ground 114. Conductive pathways may be included, or utilized, within tire 108 to allow for the flow of electricity as described above, and will be described further below.

System 100 may include one or more resistor within system 100 for the purpose of reducing the voltage supplied from generator 102 to a desired voltage for storage in electricity storage device 110. System 100 may include one or more resistor within system 100 for the purpose of reducing the voltage supplied from generator 102 to a desired voltage for use in powering electronic device 112.

Figure 2A:
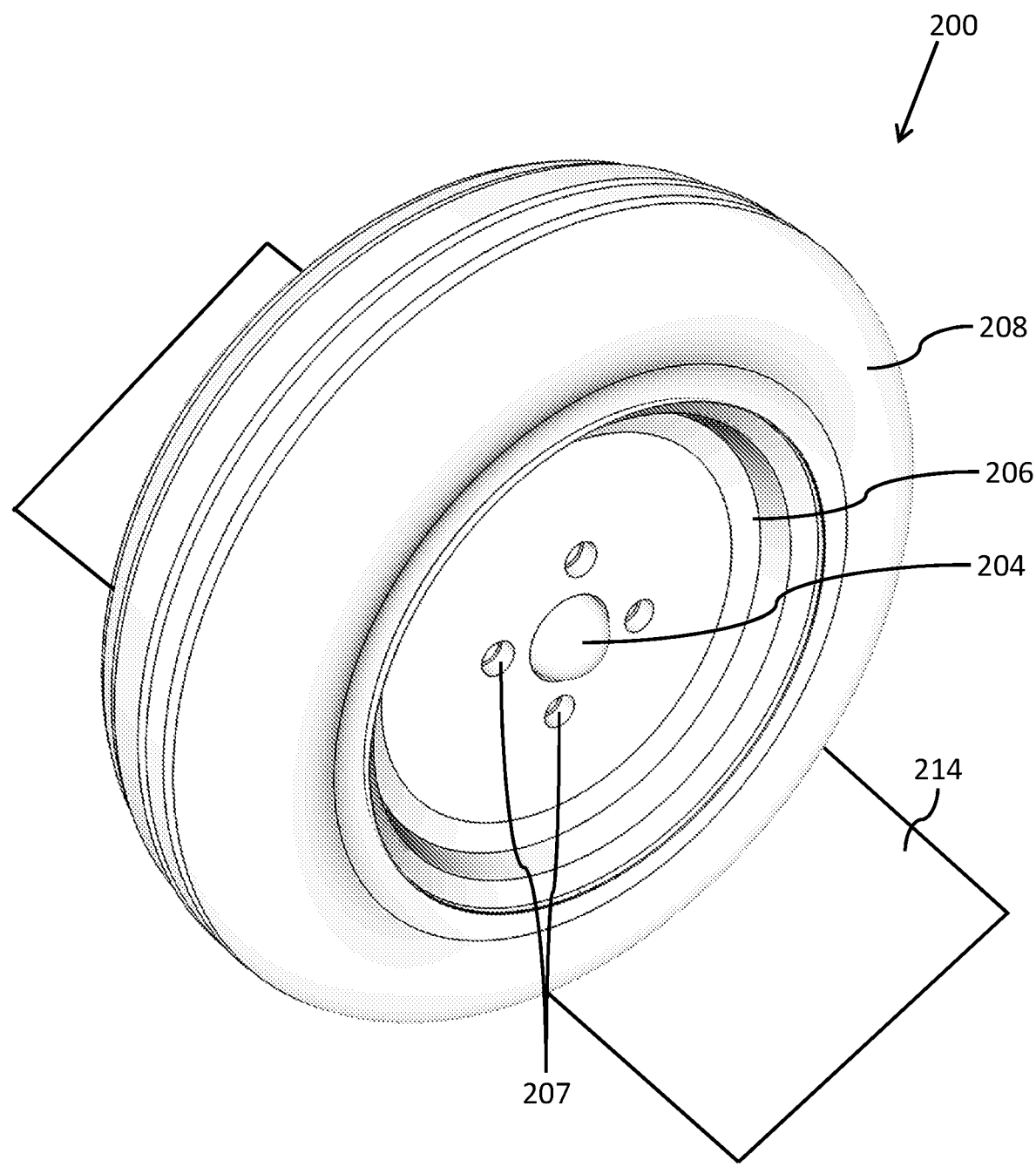
FIG. 2A illustrates a perspective view of a system 200 for harvesting energy for an electronic device in a tire 208.
Figure 2B:
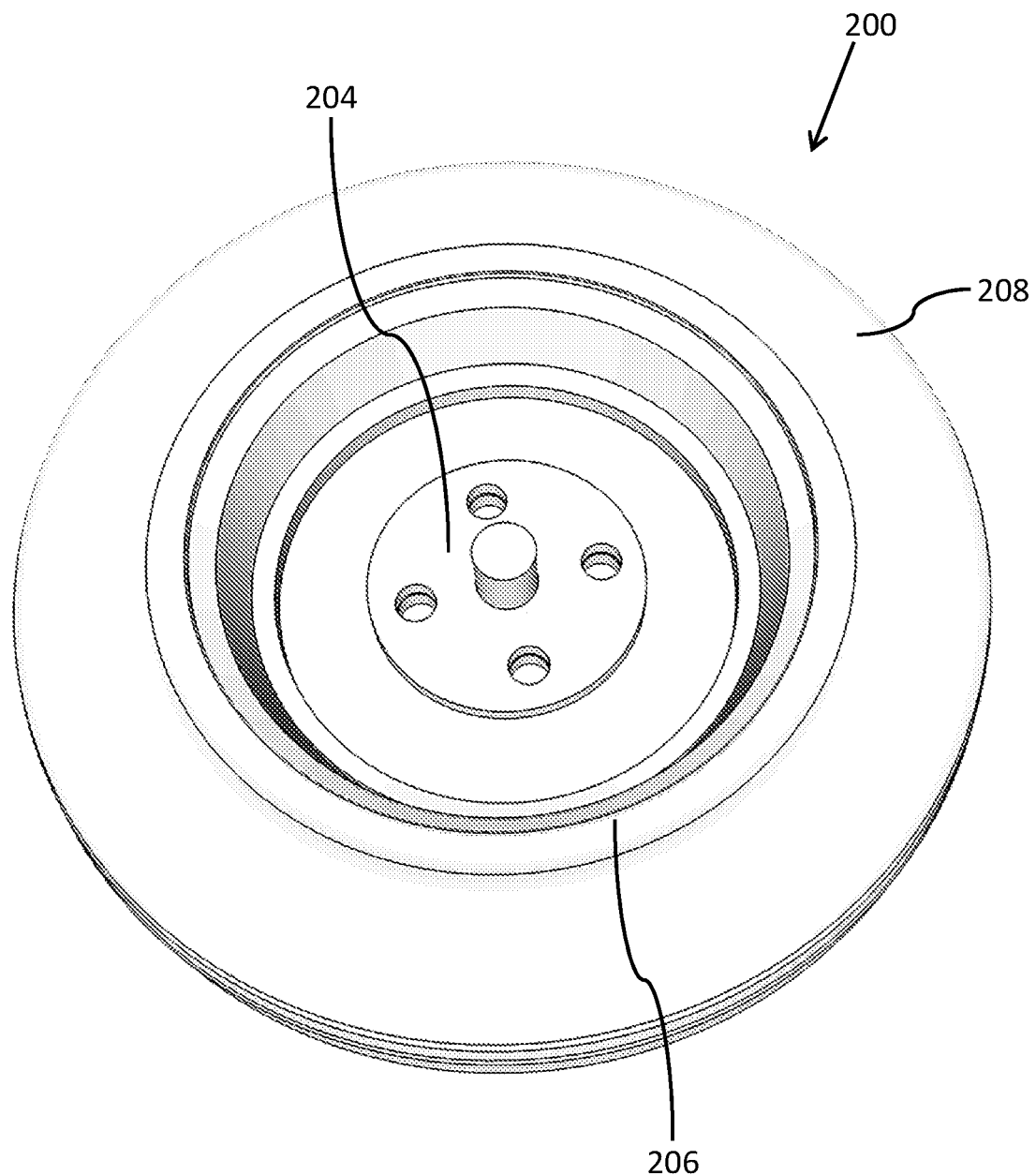
FIG. 2B illustrates a perspective view of system 200 for harvesting energy for an electronic device in tire 208.

FIGS. 2A and 2B illustrate a system 200 for harvesting energy for an electronic device in a tire 208. System 200 may include a wheel hub 204, a wheel 206, and a tire 208. Wheel 206 may include a plurality of lug holes 207. Lug holes 207 may accept lugs (threaded fasteners, not shown) extending between wheel hub 204 and wheel 206, through lug holes 207. The lugs may be secured with lug nuts (not shown), thus removably fixing wheel 206 to wheel hub 204. Where electrical current passes from wheel hub 204 to wheel 206, current may pass through a direct physical contact between wheel hub 204 and wheel 206, through the physical contact between at least two of wheel hub 204, lugs, lug holes 207, and lug nuts, or both. It should be understood that wheel hub 204 may directly physically contact wheel 206. However, one or both of wheel hub 204 and wheel 206 may be coated with a paint or sealer, and thus contact between the two may not permit the flow of electricity (as the coatings are typically not electrically conductive, and thus electrically insulate one or both of the two). Accordingly, while wheel hub 204 and wheel 206 may directly physically contact one another, this contact may not result in an electrical contact, and electrical contact may take place through the physical contact between the lugs, lug holes 207, and lug nuts, which may include uncoated mating surfaces. Alternatively, at least one of lug holes 207 may be defined by an annular wall that includes a conductive area, similar to 1036, 1136, 1236, 1336, 1436, and 1536 described in more detail below.

As illustrated in FIG. 2A, tire 208 may contact ground 214. Ground 214 may be any surface upon which tire 208 travels which is connected to the earth, including for example, a roadway. Tire 208 will contact ground 214 at least in its contact patch (the flat area of a tire created when the tire rests upon a surface under loading). Thus, as described further below, a ground path in tire 208 will be oriented in a portion of the tire's tread that is oriented in the contact patch of tire 208.

Figure 3:
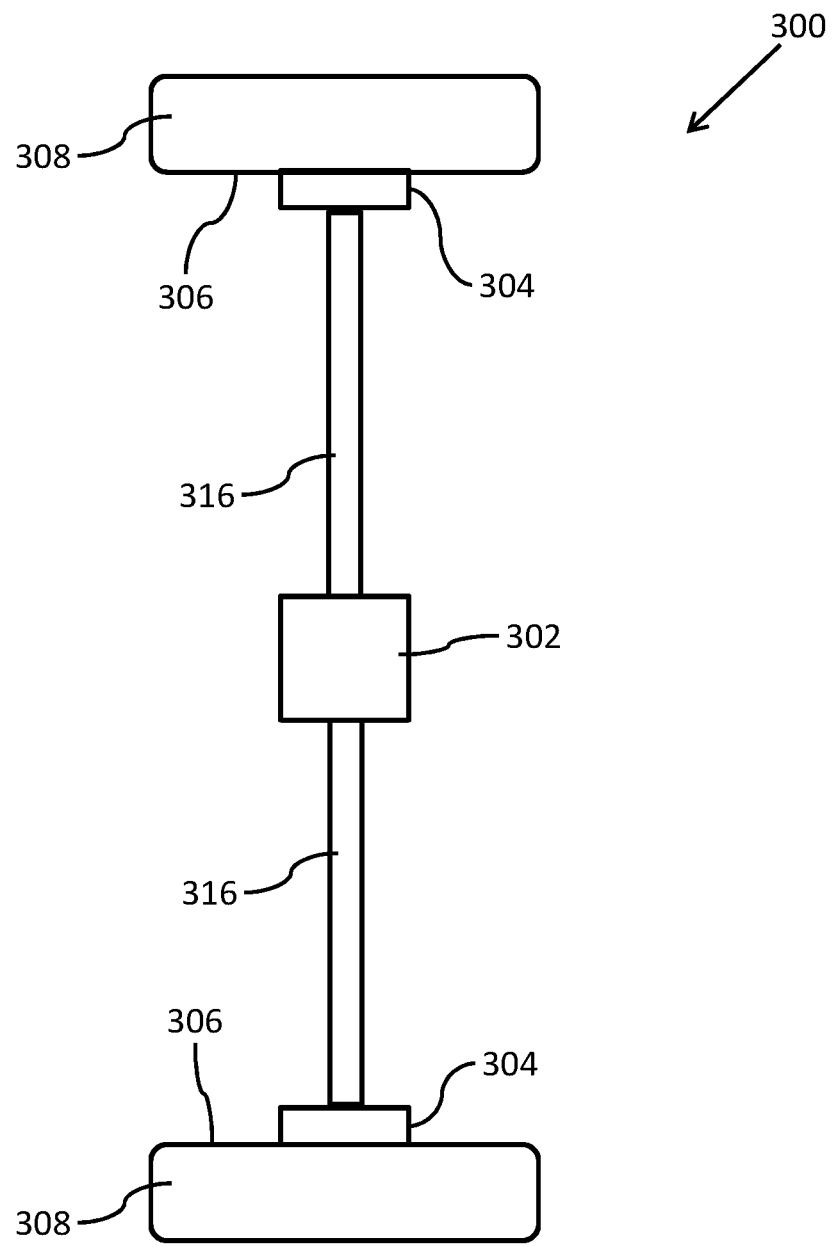
FIG. 3 illustrates a plan view of a system 300 for harvesting energy for an electronic device in a tire 308.

FIG. 3 illustrates a system 300 for harvesting energy for an electronic device in a tire 308. System 300 may include a generator 302 in the form of an electric motor driving axles 316. The electric motor may be a DC motor, which, when run in reverse during braking, acts as a generator. Axles 316 may connect to wheel hubs 304. Wheel hubs 304 connect to wheels 306, upon which tires 308 are mounted. Axles 316, hubs 304, and wheels 306 are metallic and electrically conductive. As such, electricity generated by generator 302 may be fed into axles 316, and travel through hubs 304 and into wheels 306. From wheels 306, the electricity may travel through conductive elements and/or conductive metallic belts in tires 308 to an electricity storage device and/or electronic device oriented within tire 308. Thus, a conductive pathway exists from generator 302 to an electricity storage device and/or electronic device contained within tire 308. Generator 302, axles 316, wheel hub 304, and wheels 306, may be electrically isolated from other components of the vehicle or ground. Tire 308 may be electrically connected to ground, and otherwise electrically isolated with the exception of tire 308's electrical connection to wheels 306. In this manner, an electrical circuit is created through the aforementioned components from generator 302 to ground (e.g., 114, 214), thus allowing an electrical current to pass through the circuit.

FIG. 4 illustrates a sectional view of a system 400 for harvesting energy for an electronic device in a tire 408. The system includes a wheel 406 upon which tire 408 is mounted, wheel 406 being operatively connected to an axle 416. A generator 418 may be operatively connected to wheel 406. Generator 418 may be rotationally connected to wheel 406. Generator 418 may generate electricity by rotation of generator 418, rotation of wheel 406, or both relative to one another. For example, generator 418 may have a central shaft (not shown) about which is mounted an eccentric mass, such that as wheel 406 rotates, the eccentric mass rotates. Generator 418 may include a magnet or a coil attached to the central shaft, the eccentric mass, or wheel 406, such that one of the coil and magnet rotates with the eccentric mass, while the other of the coil and the magnet does not rotate with the eccentric mass. The result may be the generation of electricity within generator 418. This electricity may be fed through wheel 406 and into tire 408 to power electricity storage devices and electrical devices, as described further below.

FIG. 5 illustrates a sectional view of a system 500 for harvesting energy for an electronic device in a tire 508. The system includes a wheel 506 upon which tire 508 is mounted, wheel 506 being operatively connected to an axle 516.

A generator 520 may be operatively connected to wheel 506 through a wheel hub 504. Generator 520 may be rotationally isolated from wheel 506, such that generator 520 does not rotate while wheel 506 rotates. Generator 520 may include a coil.

A magnet 522 may be connected to wheel 506, and rotate with wheel 506 about generator 520, thus generating an electrical current through a coil contained within generator 520. This electricity may be fed through wheel hub 504 to wheel 506 and into tire 508 to power electricity storage devices and electrical devices, as described further below.

FIG. 6 illustrates a sectional view of a system 600 for harvesting energy for an electronic device in a tire 608. The system includes a wheel 606 upon which tire 608 is mounted, wheel 606 being operatively connected to an axle 616 via a wheel hub 604.

A generator 624 may be operatively connected to wheel 606 through axle 616's engagement of a wheel hub 604. Generator 624 may be a DC electric motor, which when run in reverse during regenerative braking, creates an electric current. This electricity may be fed through axle 616, to wheel hub 604, to wheel 606, and into tire 608 to power electricity storage devices and electrical devices, as described further below.

FIG. 7 illustrates a sectional view of a system 700 for harvesting energy for an electronic device in a tire 708. The system includes a wheel 706 upon which tire 708 is mounted, wheel 706 being operatively connected to an axle 716 via a wheel hub 704.

A generator (not shown) may be operatively connected to wheel 706 through axle 716. The generator may be a DC electric motor, which when run in reverse during regenerative braking, creates an electric current. This electricity may be fed into a current sending element 726, which is electrically connected to a current receiving element 728 of wheel 706 through a brush 730. Current sending element 726 may be connected to the vehicle body, chassis, or an otherwise stationary and non-rotating object on the vehicle. Current receiving element 728 may be an integral, annular, raised portion of wheel 706. Current receiving element 728 may be an annulus connected to wheel 706, physically, electrically, or both. Both current sending element 726 and current receiving element 728 are electrically conductive. Brush 730 is electrically conductive. Brush 730 may be connected to current sending element 726 and may slide, roll, or otherwise translate along a surface of current receiving element 728.

As current receiving element 728 is connected to wheel 706, current receiving element 728 rotates with wheel 706. Current sending element 726 may be stationary, and may be attached to the vehicle chassis. Thus, current receiving element 728 rotates relative to current sending element 726, and brush 730 provides an electrically conductive connection between these elements even when one rotates relative to the other.

Accordingly, electricity may be fed through current sending element 726, through brush 730 to current receiving element 728, to wheel 706, and into tire 708 to power electricity storage devices and electrical devices, as described further below.

FIG. 8 illustrates a sectional view of a system 800 for harvesting energy for an electronic device in a tire 808. The system includes a wheel 806 upon which tire 808 is mounted, wheel 806 being operatively connected to an axle 816 via a wheel hub 804.

A generator (not shown) may be operatively connected to wheel 806 through axle 816. The generator may be a DC electric motor, which when run in reverse during regenerative braking, creates an electric current. This electricity may be fed into a current sending element 826, which is electrically connected to a current receiving element 828 of wheel 806 through a brush 830. Current sending element 826 may be connected to wheel hub 804, and may be rotationally stationary relative to wheel 806 and current receiving element 828. Current receiving element 828 may be an integral, annular, raised portion of wheel 806. Current receiving element 828 may be connected to wheel 806, physically, electrically, or both. Both current sending element 826 and current receiving element 828 are electrically conductive. Brush 830 is electrically conductive. Brush 830 may be connected to current sending element 826 and may slide, roll, or otherwise translate along a surface of current receiving element 828. Alternatively, brush 830 may be connected to current receiving element 828 and may slide, roll, or otherwise translate along a surface of current sending element 826.

As current receiving element 828 is connected to wheel 806, current receiving element 828 rotates with wheel 806. Current sending element 826 may be stationary, and may be attached to wheel hub 804. Thus, current receiving element 828 rotates relative to current sending element 826, and brush 830 provides an electrically conductive connection between these elements even when one rotates relative to the other.

Accordingly, electricity may be fed through current sending element 826, through brush 830 to current receiving element 828, to wheel 806, and into tire 808 to power electricity storage devices and electrical devices, as described further below.

Figure 9:
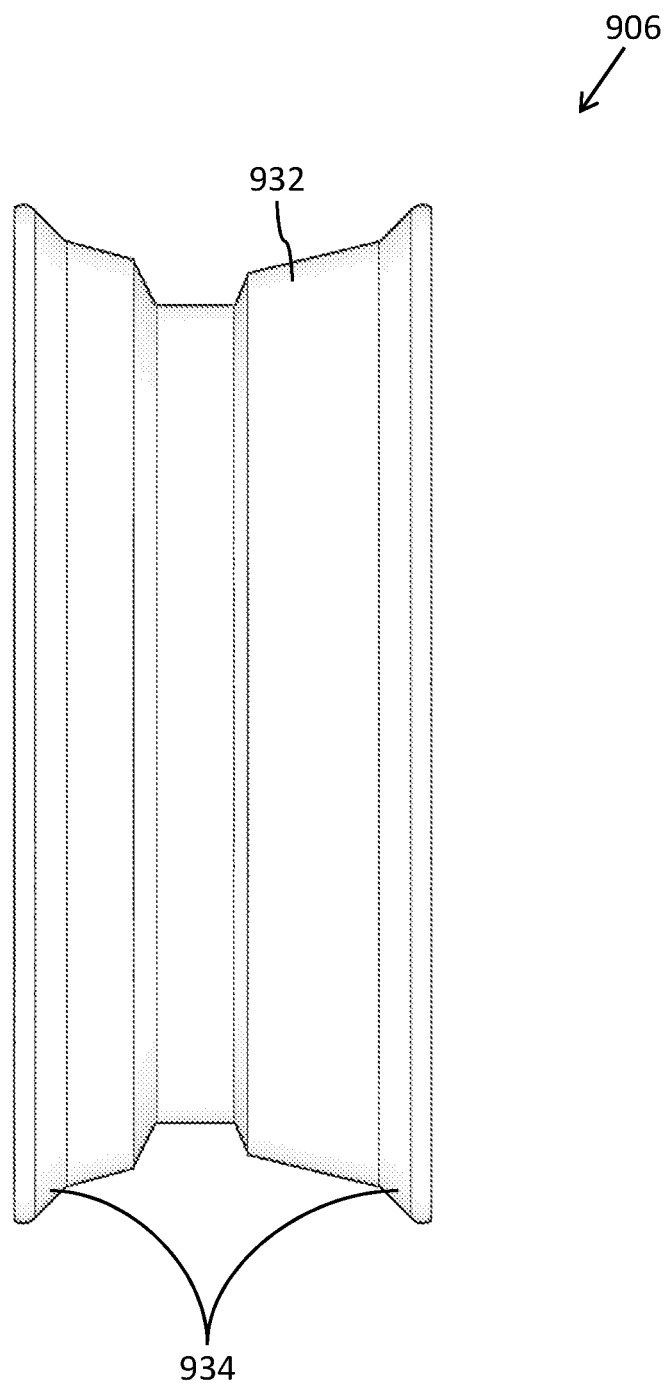
FIG. 9 illustrates an elevational view of a wheel 906 having a pair of rim lips 934.

FIG. 9 illustrates a wheel 906 having a pair of rim lips 934 on the axially outer edges of a barrel 932. Wheel 906 may be made from an electrically conductive material, including for example aluminum or steel. Additionally, wheel 906 may be coated in an electrically conductive material, such as chrome plating. Where wheel 906 is made from an uncoated electrically conductive material, or coated in an electrically conductive material, wheel 906 may transmit an electric current therethrough from a hub, axle, or directly from a generator, as described above. This current may be conducted into a tire through conductive elements and/or conductive metallic belts, as further described below.

Figure 10:
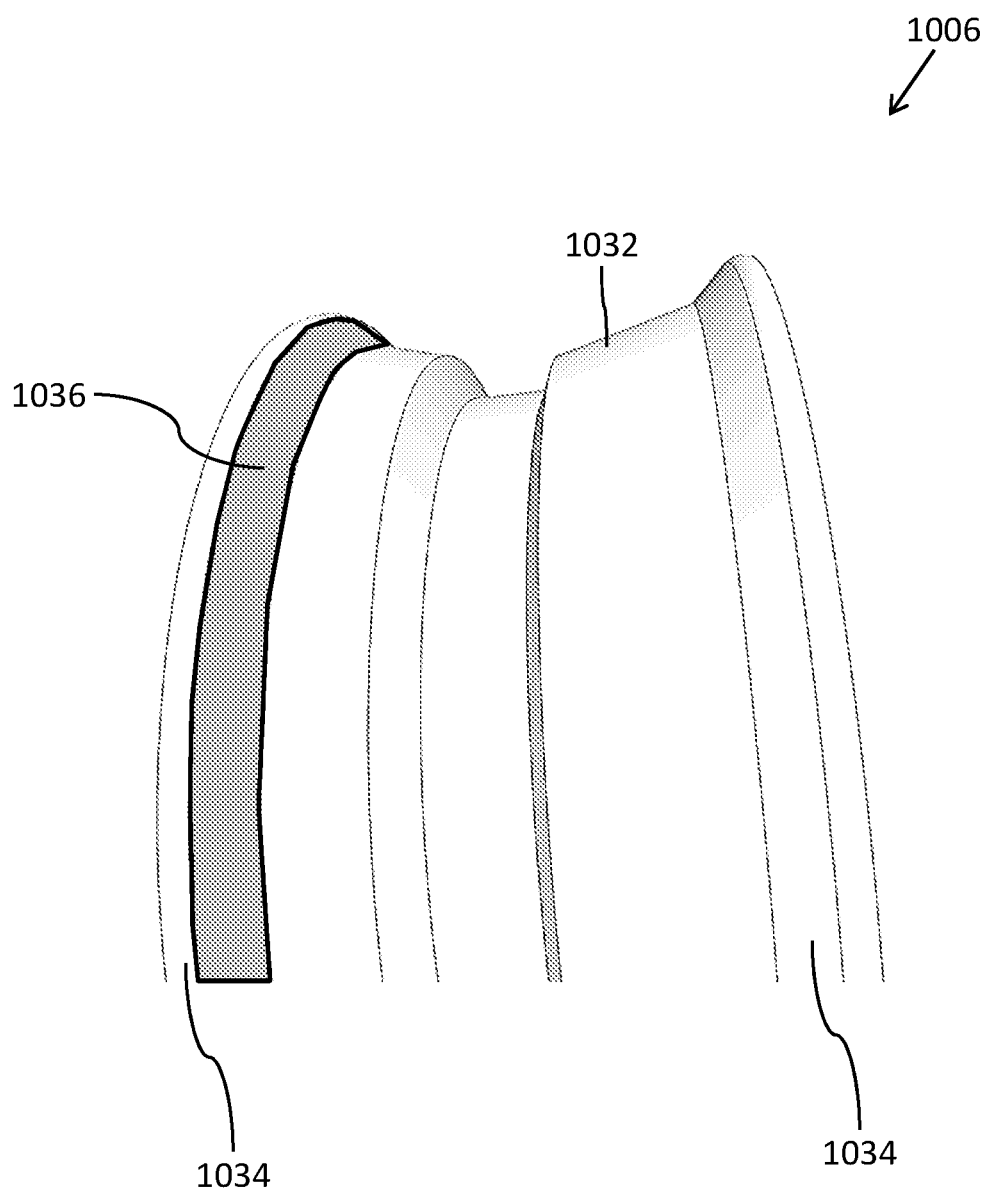
FIG. 10 illustrates a partial perspective view of a wheel 1006 having a pair of rim lips 1034, at least one including a conductive area 1036.

FIG. 10 illustrates a wheel 1006 having a pair of rim lips 1034 on the axially outer edges of a barrel 1032. At least one of the rim lips 1034 includes a conductive area 1036.

Often, wheels such as wheel 1006 may be coated in a paint or other coatings that are non-conductive. These coatings are primarily intended to preserve wheel 1006 and protect it from the elements to avoid corrosion and/or oxidation, simplify cleaning of the wheel, and the like. In such a case, electricity may not be able to pass into wheel 1006 as readily as it would wheel 906, as the coating may electrically insulate wheel 1006.

Typically, the process of mounting wheel 1006 on a vehicle, which includes inserting lugs from the wheel hub into the lug holes (such as lug holes 207 described above) of wheel 1006 and thereafter applying lug nuts to the lugs, rubs or scratches and removes the coating in the area of the lug holes enough to allow an electrical current to pass into wheel 1006 from the wheel hub at that point. This is due to the high pressure metal-on-metal contact involved in bolting wheel 1006 to the wheel hub. However, in mounting the tire to wheel 1006, the tire does not rub or scratch the coating from rip lips 1034 enough to allow an electrical coating to pass from wheel 1006 into the tire at that point.

When mounting a tire to wheel 1006, the bead of the tire, and more specifically the bead seat and bead heel, engage rim lips 1034. The inflation pressure of the tire drives the beads axially outward into contact with rim lips 1034, while the bead wire within the tire bead limits the diameter of the bead, causing the tire to fit tightly against rim lips 1034.

In order to ensure that conductive elements oriented in the bead seat and/or bead heel region of the tire are able to make electrical contact with an uncoated portion of wheel 1006, at least one rim lip 1034 may include a partially-circumferential or completely-circumferential conductive area 1036. Conductive area 1036 may be an area where a non-conductive coating of wheel 1006 has been removed from rim lip 1034. Optionally, a conductive coating may be placed over the portion of rim lip 1034 in which the non-conductive coating was removed, to aid in corrosion and oxidation resistance in wheel 1006. The conductive coating may include a paint or grease having increased conductivity via the introduction of conductive elements, such as metallic flake or carbon elements.

Wheel 1006 may be used with a tire having a conductive element that is oriented at a single point circumferentially on the tire, such as conductive element 2142 of tire 2100, described further below. Where conductive area 1036 is completely circumferential about wheel 1006, the angular alignment of a tire relative to wheel 1006 is not important, as conductive element 2142 will contact conductive area 1036 regardless of the angular alignment.

Where conductive area 1036 is partially circumferential about wheel 1006, the angular alignment of a tire relative to wheel 1006 must be properly oriented, as conductive element 2142 will contact conductive area 1036 only in a specific angular alignment, or range of angular alignment corresponding to the circumferential length of the partially circumferential conductive area 1036. In such an embodiment, tire 2100 and wheel 1006 may have markings or other indicators that may be identified by an individual installing tire 2100 on wheel 1006 to facilitate proper angular alignment of tire 2100 on wheel 1006 to ensure contact between conductive element 2142 with conductive area 1036.

Similarly, where wheel 1006 only include a conductive area 1036 on one of its rim lips 1034, wheel 1006 may include a marking or other indicator on wheel 1006 to enable an individual installing a tire on wheel 1006 to determine which rim lip 1034 contains conductive area 1036. A tire, such as tire 2100, may include a conductive element 2142 on only one side of tire 2100, and thus may include a similar marking or indicator to enable an individual installing tire 2100 on a wheel to match the conductive sides of the tire and wheel to ensure contact between the conductive element and the conductive area, and as a result, that a conductive pathway is formed.

Wheel 1006 may be used with a tire having a conductive element that is oriented completely circumferentially about the tire, such as conductive element 2242 of tire 2200, described further below. That is, whether conductive area 1036 is partially or completely circumferential, the completely circumferential conductive element 2242 will make contact with the conductive area regardless of angular alignment, assuming that conducive element 2242 and conductive area 1036 are oriented on the same side of the tire and wheel assembly. Tire 2200 and wheel 1006 may include markings or indicators to illustrate which side (if only one) of tire 2200 and wheel 1006 include the conductive features, such that an individual installing the tire on the wheel may ensure proper orientation thereof.

Figure 11:
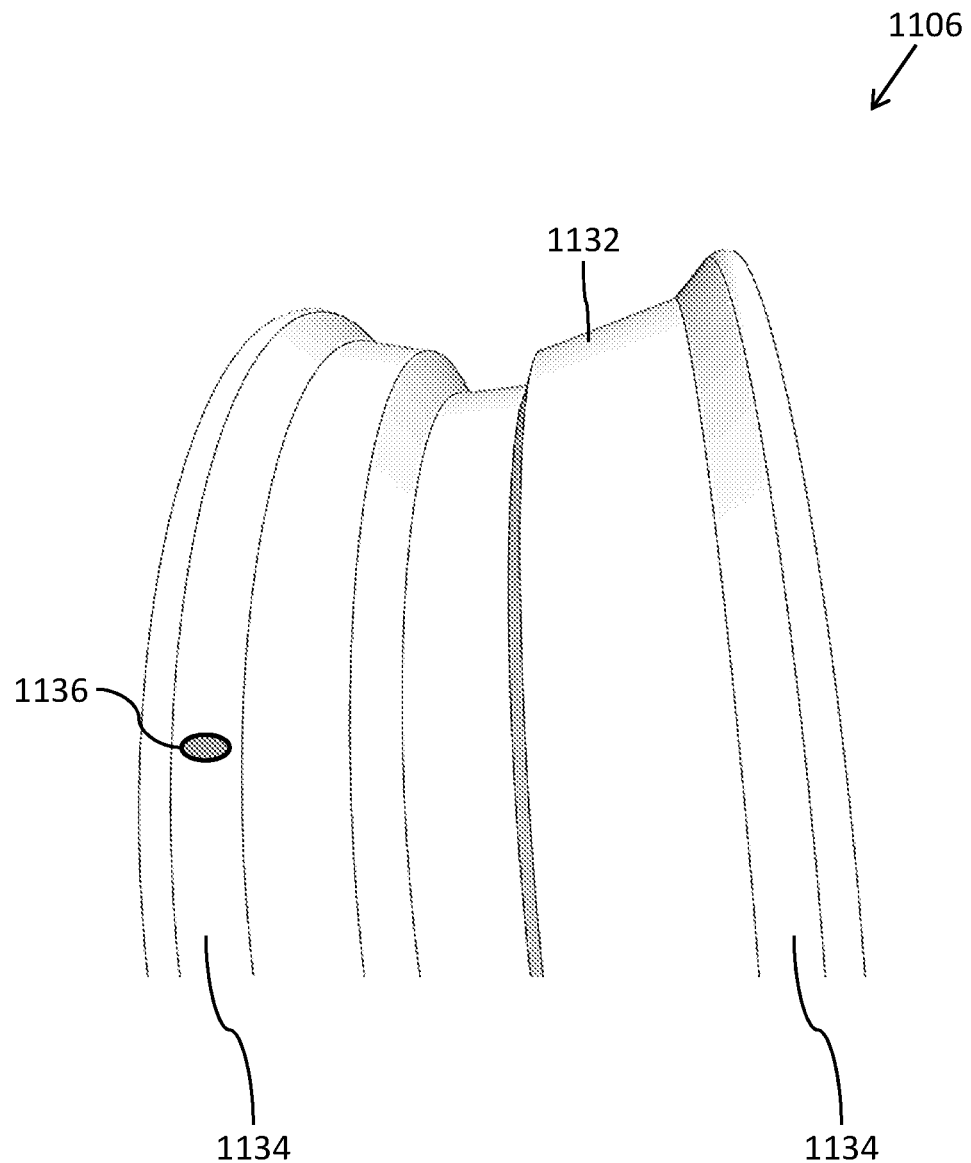
FIG. 11 illustrates a partial perspective view of a wheel 1106 having a pair of rim lips 1134, at least one including a conductive area 1136.

FIG. 11 illustrates a wheel 1106 having a pair of rim lips 1134, at least one including at least one conductive area 1136. Conductive area 1136 may be similar to conductive area 1036 of wheel 1006, and may be used and formed in the same manner. Specifically, conductive area 1136 may be an area of rim lip 1134 where a non-conductive insulative coating or paint has been removed.

Conductive area 1136 may be oriented at a single circumferential point on rim lip 1134. Conductive area 1136 may be oriented at a plurality of circumferential points on rim lip 1134.

Wheel 1106 may be used with a tire having a conductive element that is oriented at a single point circumferentially on the tire, such as conductive element 2142 of tire 2100, described further below. In this use, the angular alignment of a tire relative to wheel 1106 must be properly oriented, as conductive element 2142 will contact conductive area 1136 only in a specific angular alignment, or range of angular alignment corresponding to the circumferential length of the partially circumferential conductive area 1136. In such an embodiment, tire 2100 and wheel 1106 may have markings or other indicators that may be identified by an individual installing tire 2100 on wheel 1106 to facilitate proper angular alignment of tire 2100 on wheel 1106 to ensure contact between conductive element 2142 with conductive area 1136.

Similarly, where wheel 1106 only include a conductive area 1136 on one of its rim lips 1134, wheel 1106 may include a marking or other indicator on wheel 1106 to enable an individual installing a tire on wheel 1106 to determine which rim lip 1134 contains conductive area 1136. A tire, such as tire 2100, may include a conductive element 2142 on only one side of tire 2100, and thus may include a similar marking or indicator to enable an individual installing tire 2100 on a wheel to match the conductive sides of the tire and wheel to ensure contact between the conductive element and the conductive area, and as a result, that a conductive pathway is formed.

Wheel 1106 may be used with a tire having a conductive element that is oriented completely circumferentially about the tire, such as conductive element 2242 of tire 2200, described further below. The completely circumferential conductive element 2242 will make contact with conductive area 1136 regardless of angular alignment, assuming that conducive element 2242 and conductive area 1136 are oriented on the same side of the tire and wheel assembly. Tire 2200 and wheel 1106 may include markings or indicators to illustrate which side (if only one) of tire 2200 and wheel 1106 include the conductive features, such that an individual installing the tire on the wheel may ensure proper orientation thereof.

Figure 12:
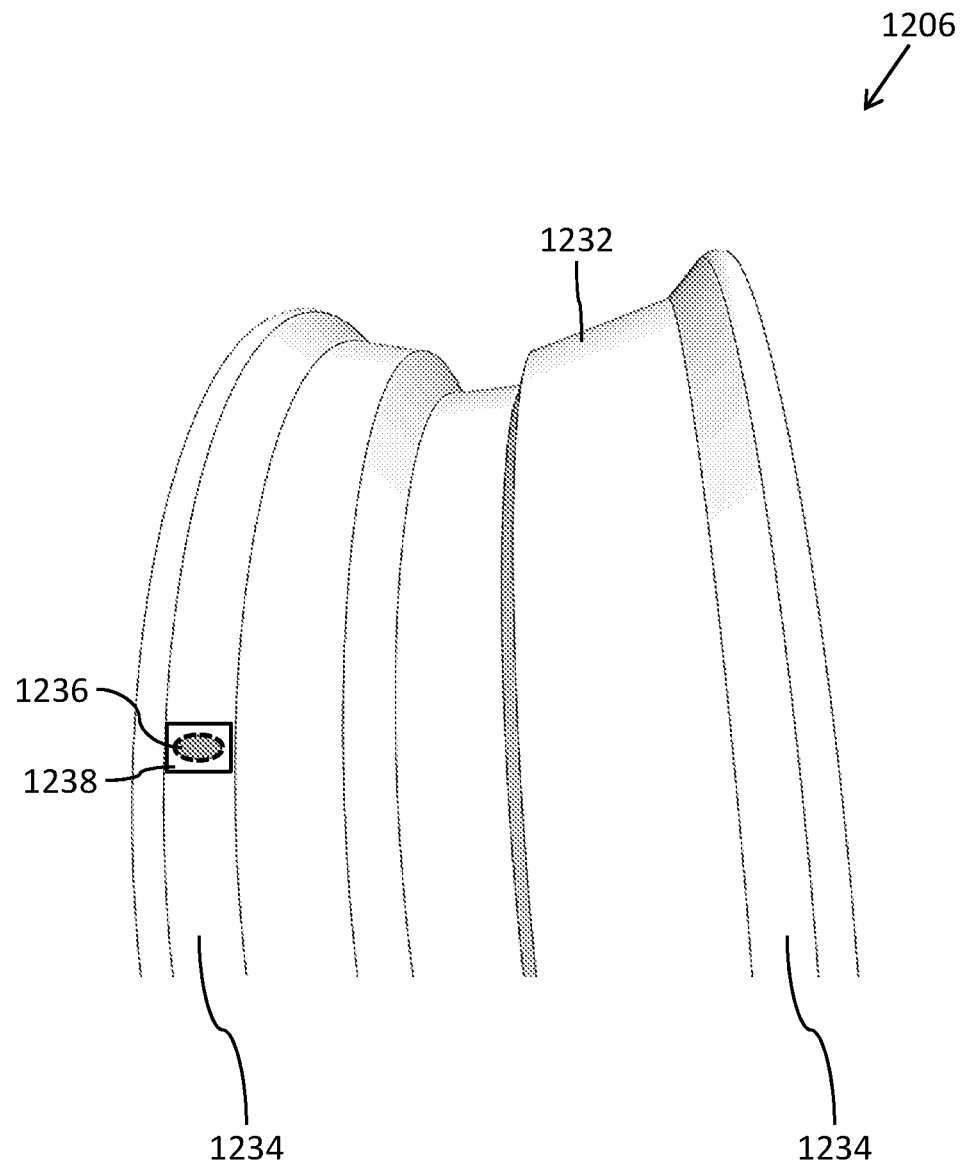
FIG. 12 illustrates a partial perspective view of a wheel 1206 having a pair of rim lips 1234, at least one including a conductive area 1236.

FIG. 12 illustrates a wheel 1206 having a pair of rim lips 1234, at least one including at least one conductive area 1236. Conductive area 1236 may be similar to conductive area 1036 of wheel 1006, and may be used and formed in the same manner. Specifically, conductive area 1236 may be an area of rim lip 1234 where a non-conductive insulative coating or paint has been removed. In order to avoid or mitigate corrosion or oxidation at the site of removal of the non-conductive coating or paint, a conductive coating 1238 may be placed as a cap over conductive area 1236. Conductive coating 1238 may completely cover conductive area 1236 and act to seal conductive area 1236 from the elements, moisture, air, or the like, which may cause corrosion or oxidation. Conductive coating 1238 may include a paint or grease having increased conductivity via the introduction of conductive elements, such as metallic flake or carbon elements.

Figure 13:
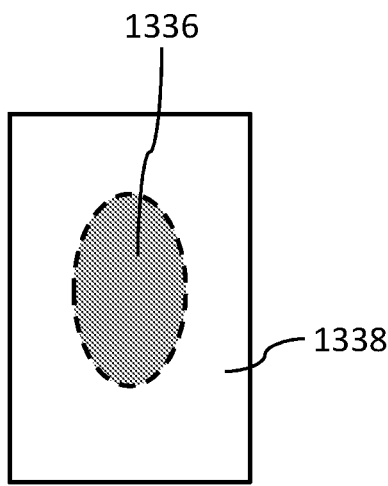
FIG. 13 illustrates a plan view of a conductive area 1336 sealed by a conductive cover 1338.

FIG. 13 illustrates a conductive area 1336 sealed by a conductive cover 1338. As described with respect to FIG. 12, conductive area 1336 may be an where a non-conductive insulative coating or paint has been removed. Conductive cover 1338 may act to cap conductive area 1336 and seal conductive area 1336 from the elements, moisture, air, or the like, which may cause corrosion or oxidation. Conductive coating 1338 may include a paint or grease having increased conductivity via the introduction of conductive elements, such as metallic flake or carbon elements.

Figure 14:
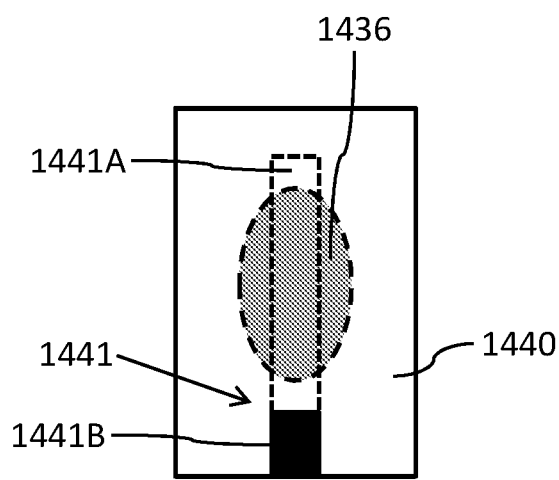
FIG. 14 illustrates a plan view of a conductive area 1436 sealed by a non-conductive cover 1440, and a conductor 1441 oriented therebetween.

FIG. 14 illustrates a conductive area 1436 sealed by a non-conductive cover 1440, and a conductor 1441 oriented therebetween. Conductive area 1436 may be substantially similar to conductive areas 1136, 1236, and 1336 described above.

Non-conductive cover 1440 may be any of a variety of materials that act to cap conductive area 1436 and seal conductive area 1436 from the elements, moisture, air, or the like, which may cause corrosion or oxidation.

Conductor 1441 may include a distal, wheel contact end 1441A, and a proximal tire contact end 1441B. Wheel contact end 1441A may be oriented in physical and/or electrical contact with conductive area 1436, sandwiched between the wheel and non-conductive cover 1440. Tire contact end 1441B may be a portion of conductor 1441 that extends outside of the union of the wheel and non-conductive cover 1440, and which may fold over non-conductive cover 1440. In this manner, tire contact end 1441B may extend outside of non-conductive cover 1440 and be oriented in physical and/or electrical contact with a tire (not shown). It should be understood that conductor 1441 is a continuous electrically conductive element, such that wheel contact end 1441A and tire contact end 1441B are electrically connected to one another. Conductor 1441 may be a metallic strip of material that includes electrically conductive properties.

Figure 15:
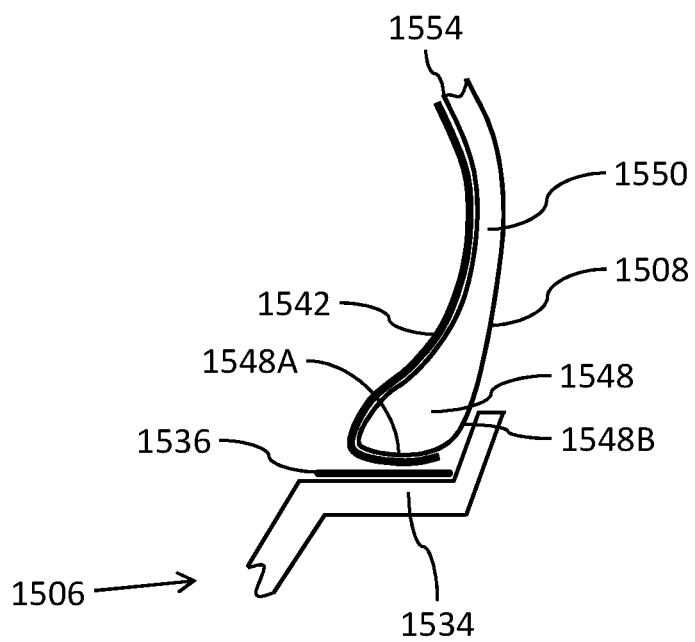
FIG. 15 illustrates a sectional view of a tire 1508 engaging a rim lip 1534 of a wheel.

FIG. 15 illustrates a tire 1508 engaging a rim lip 1534 of a wheel 1506. Wheel 1506 may include at least one rim lip 1534 having at least one conductive area 1536.

Tire 1508 includes a bead portion 1548, including a bead seat 1548A and a bead heel 1548B. As illustrated, bead seat 1548A is oriented on a radially inner part of bead portion 1548, whereas bead heel 1548B is oriented on an axially outer part of bead portion 1548. Bead seat 1548A and bead heel 1548B are the primary contact points between tire 1508 and wheel 1506 (these elements have been illustrated with small gaps to more readily indicate the orientations and differentiation between the elements, but it is noted that in practice these elements would be firmly connected to one another and likely under a large degree of pressure).

Tire 1508 includes a conductive element 1542 extending from at least one of bead seat 1548A and bead heel 1548B, and along at least a portion of an inner surface 1554 of a tire sidewall 1550. While only one side of tire 1508 and thus only one bead portion 1548 is illustrated, it is understood that tire 1508 has two bead portions 1548, and both bead portions 1548, including at least one of both bead seats 1548A and both bead heels 1548B may include conductive elements 1542 as described.

Conductive element 1542 may be made up of any of a variety of materials capable of conducting electricity, including, for example, a metal, or a polymer or rubber having high carbon content. Conductive element 1542 may use an electrical wire capable of carrying a current. Conductive element 1542 may use a conductive rubber material commonly referred to as "antenna" in tire technology.

Conductive element 1542 may be integrally incorporated into tire 1508. Conductive element 1542 may be laminated with inner surface 1554 via an adhesive or other fastening mechanism.

In one aspect, conductive element 1542 is a conductive pathway made up of conductive rubber material, similar to or the same as "antenna" material used in a tire's tread to pass electricity, including static electricity, from a tire. In one aspect, the antenna is oriented inside of tire 1508 and axially inward and/or radially inward of inner surface 1554. Alternatively, the antenna is oriented between layers of tire 1508 (for example, between an innerliner ply, as may be shown in FIG. 23 described below).

Figure 16:
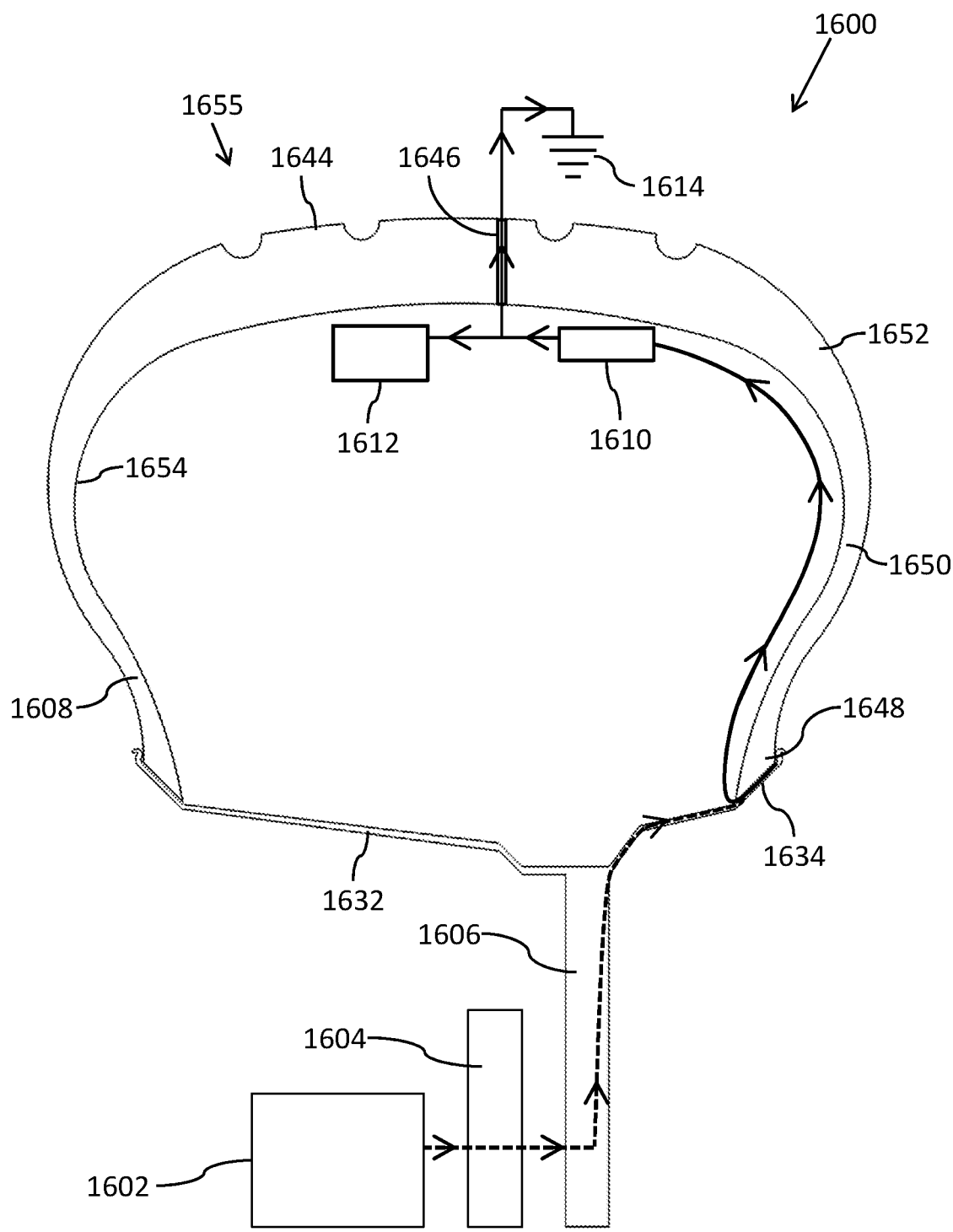
FIG. 16 illustrates a sectional schematic view of a system 1600 for harvesting energy for an electronic device 1612 in a tire 1608.

FIG. 16 illustrates a sectional schematic of a system 1600 for harvesting energy for an electronic device 1612 in a tire 1608. A flow of electrical current is illustrated via lines including arrows. System 1600 may include a generator 1602 electrically connected to a wheel hub 1604, which may be electrically connected to a wheel 1606.

A tire 1608 may be mounted to wheel 1606, and may be electrically connected to wheel 1606. Contact between at least one rim lip 1634 of wheel 1606 and at least one bead portion 1648 may allow electricity to pass from wheel 1606 to tire 1608. Electricity may pass generally from the area of at least one bead portion 1648, to at least one sidewall 1650, to at least one shoulder 1652, and into a general area of a tread 1644.

Oriented at any point within the chamber created by tire 1608's engagement with wheel 1606, bounded by tire 1608's inner surface 1654, and wheel 1606's barrel 1632, may be oriented at least one electricity storage device 1610, and at least one electronic device 1612.

One or both of electricity storage device 1610 and electronic device 1612 may be connected to inner surface 1654 in the area of tire 1608 referred to as the tread region 1655, which includes tread 1644.

One or both of electricity storage device 1610 and electronic device 1612 may be oriented radially outwardly of inner surface 1654 and radially inwardly of tread 1644, such that one or both of electricity storage device 1610 and electronic device 1612 is contained between an innerliner and a body ply, a body ply and a belt, a belt and a tread gauge, or the like. That is, one or both of electricity storage device 1610 and electronic device 1612 may be contained within the thickness of tire 1608 in tread region 1655, rather than within the chamber created by tire 1608's engagement with wheel 1606, bounded by tire 1608's inner surface 1654, and wheel 1606's barrel 1632.

One or both of electricity storage device 1610 and electronic device 1612 may be embedded between any of the contiguous layers of material that may make up tire 1608, during the manufacturing of tire 1608, such layers including without limitation: an innerliner, a body ply, a bead filler, a gum strip, a shoulder insert, a belt, a cap ply, a tread, and a sidewall ply. It is understood that tire construction can vary greatly, and that the list above is neither intended to be exhaustive, nor inclusive, of every possible material layer within a tire.

Electricity in excess of that required to power one or more electronic device 1612 from electricity storage device 1610 may pass to a ground 1614 through a ground path 1646 in tread 1644. Ground path 1646, like the conductive elements described herein, may be any variety of materials capable of conducting electricity, including antenna. In one aspect, ground path 1646 is antenna. In operation, tread 1644 of tire 1608 contacts ground 1614, and ground path 1646 likewise contacts ground 1614 to permit the transmission of electricity to ground 1614. Ground path 1646 may extend through the entire thickness of tire 1608 in tread region 1655, from inner surface 1654 to a contact patch of tread 1644 on an exterior surface of tire 1608.

In this manner, a conductive path may be created from generator 1602, all the way to electricity storage device 1610 and electronic device 1612, with electrical energy in excess of that required to power an electronic device 1612 being passed to ground 1614. The ability to pass this excess energy to ground 1614 allows tire 1608 to continue to function in a manner such that a vehicle upon which tire 1608 is mounted is grounded, thereby preventing the buildup of electrical energy in the vehicle that may result in sparks, electrical shocks, or other unwanted charges that may create hazards or discomfort to users of the vehicle. System 1600 utilizes a portion of the electrical energy that would otherwise be passed directly to ground 1614 to be stored in at least one electricity storage device 1610 and power at least one electronic device 1612. System 1600 creates a circuit that allows electricity to flow from generator 1602 to at least one electricity storage device 1610 and power at least one electronic device 1612.

Figure 17:
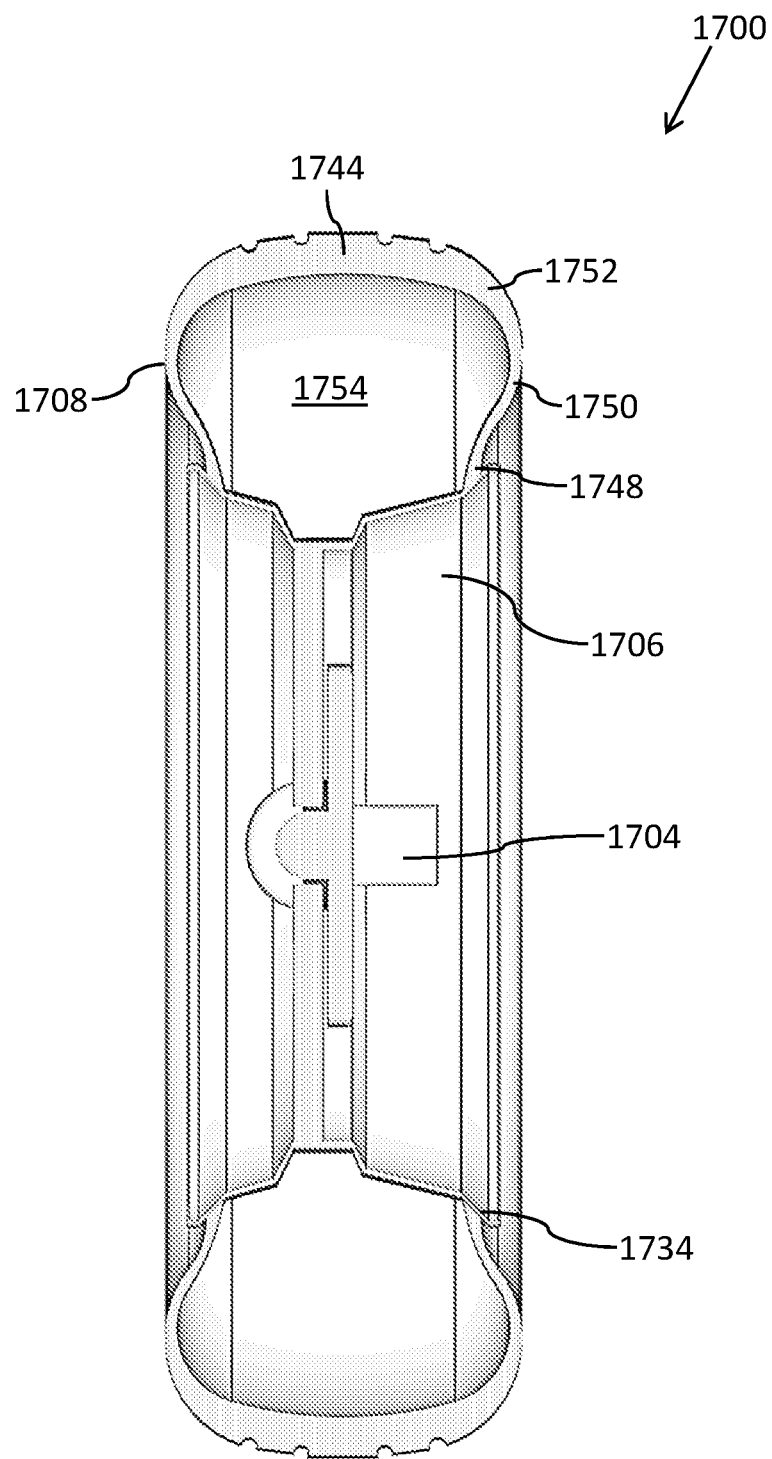
FIG. 17 illustrates a sectional view of a system 1700 for harvesting energy for an electronic device in a tire 1708.

FIG. 17 illustrates a sectional view of a system 1700 for harvesting energy for an electronic device in a tire 1708. System 1700 includes a wheel hub 1704, a wheel 1706, and a tire 1708. Wheel 1706 includes a pair of rim lips 1734, contacting a bead portion 1748 of tire 1708.

Tire 1708 includes a pair of bead portions 1748, a pair of sidewalls 1750, a pair of shoulders 1752, and a tread 1744. Tire 1708 includes an inner surface 1754.

System 1700 may include additional components, such as those included in system 1600, to allow the transfer of electricity from a generator to at least one electricity storage device and at least one electronic device, as described above.

Figure 18:
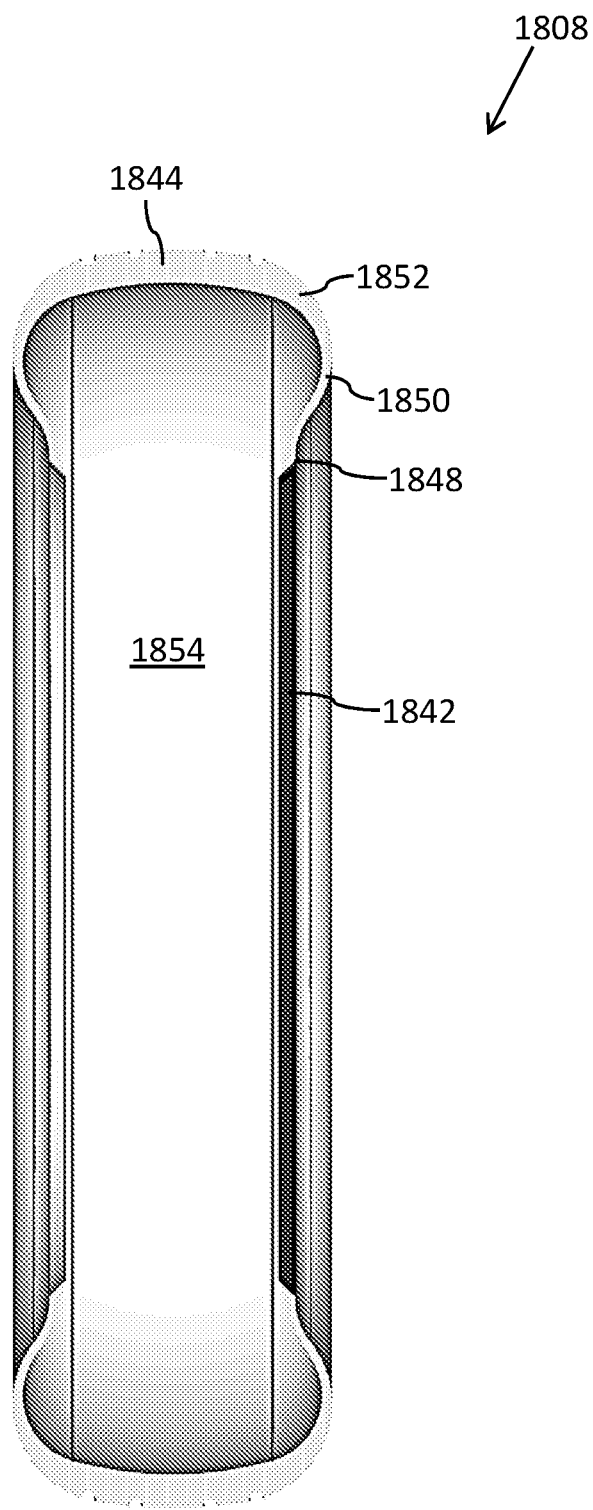
FIG. 18 illustrates a sectional view of a tire 1808.

FIG. 18 illustrates a sectional view of a tire 1808. Similar to tires 1608 and 1708, tire 1808 includes a pair of bead portions 1848, a pair of sidewalls 1850, a pair of shoulders 1852, a tread 1844, and an inner surface 1854. Tire 1808 includes a conductive element 1842 that begins in at least one bead portion 1848, and extends into tire 1808 to a position where it electrically contacts one or more electricity storage device.

Figure 19:
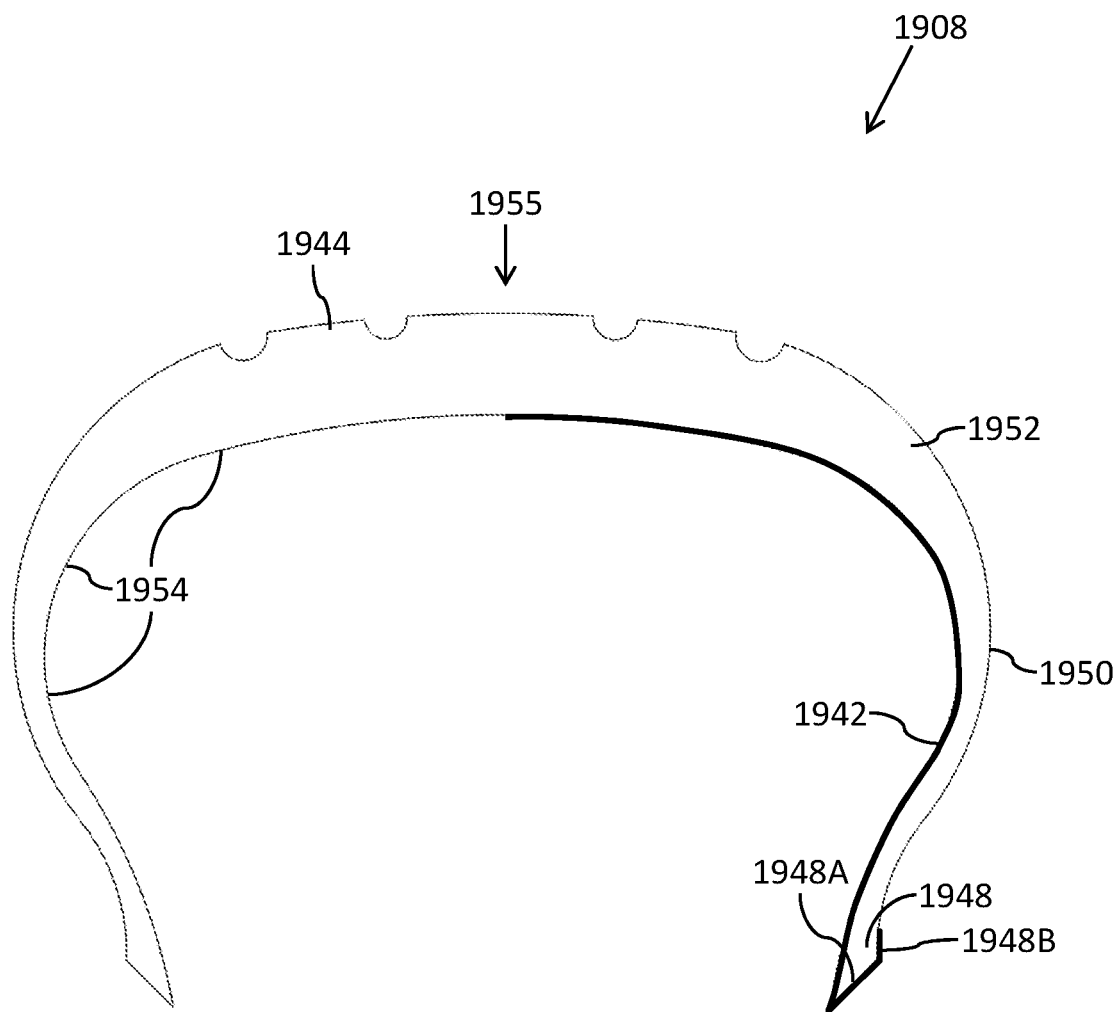
FIG. 19 illustrates a sectional view of a tire 1908 having a conductive element 1942 applied to an inner surface 1954 of tire 1908.

FIG. 19 illustrates a sectional view of a tire 1908 having a conductive element 1942 applied to an inner surface 1954 of tire 1908. Tire 1908 includes a pair of bead portions 1948, a pair of sidewalls 1950, a pair of shoulders 1952, and a tread 1944 that is located in a tread region 1955.

Each bead portion 1948 may include a bead seat 1948A and a bead heel 1948B. At least one conductive element 1942 may extend from at least one bead portion 1948 along at least one sidewall 1950, along at least one shoulder 1952, and terminate in tread region 1955. At least one conductive element 1942 is oriented in contact with inner surface 1954.

In one embodiment, at least one conductive element 1942 extends from bead seat 1948A along inner surface 1954 and terminates in tread region 1955. In another embodiment, at least one conductive element 1942 extends from bead heel 1948B along inner surface 1954 and terminates in tread region 1955.

Inner surface 1954 may be an innerliner, and may include a butyl rubber compound. Inner surface 1954 may be a body ply. Inner surface 1954 may be the radially innermost surface of tire 1908 with the exception of at least one conductive element 1942, which may be oriented radially inwardly from inner surface 1954.

Figure 20:
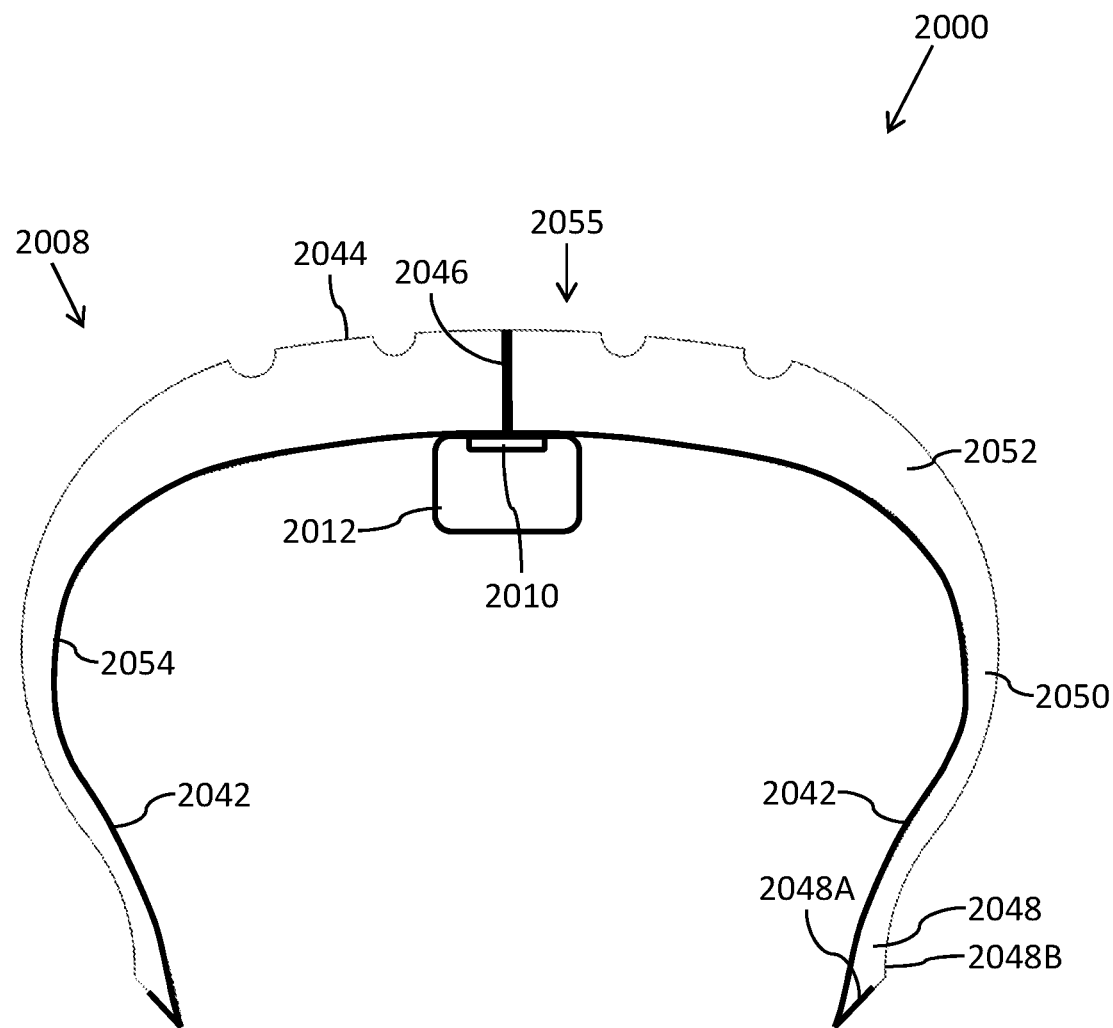
FIG. 20 illustrates a sectional view of a system 2000 for harvesting energy for an electronic device 2012 in a tire 2008.

FIG. 20 illustrates a sectional view of a system 2000 for harvesting energy for an electronic device 2012 in a tire 2008.

Tire 2008 includes a pair of bead portions 2048, a pair of sidewalls 2050, a pair of shoulders 2052, and a tread 2044 that is located in a tread region 2055. Tire 2008 includes an inner surface 2054.

Each bead portion 2048 includes a bead seat 2048A and a bead heel 2048B. One or more conductive element 2042 may extend from one or each bead portion 2048, along one or each sidewall 2050, along one or each shoulder 2052, and into tread region 2055. The one or more conductive element 2042 is oriented upon inner surface 2054. Each of the one or more conductive elements 2042 may originate at each bead seat 2048A. Each of the one or more conductive elements 2042 may originate at one or each bead heel 2048B, and extend along one or each bead seat 2048A and along one or each sidewall 2050, and so on until it reaches tread region 2055.

System 2000 may include at least one electricity storage device 2010 and at least one electronic device 2012. The at least one conductive element 2042 is electrically connected to at least one electricity storage device 2010. At least one electricity storage device 2010 is electrically connected to at least one electronic device 2012.

Electricity in excess of that required to power one or more electronic device 2012 from electricity storage device 2010 may pass to a ground through a ground path 2046 in tread 2044. Ground path 2046, like the conductive elements described herein, may be any variety of materials capable of conducting electricity, including antenna. In one aspect, ground path 2046 is antenna. The ground may be earth, a road surface, or any surface upon which tire 2008 operates that is connected to the earth. In operation, tread 2044 of tire 2008 contacts the ground, and ground path 2046 likewise contacts the ground to permit the transmission of electricity to the ground. Ground path 2046 may extend through the entire thickness of tire 2008 in tread region 2055, from inner surface 2054 to a contact patch of tread 2044 on an exterior surface of tire 2008.

As illustrated, at least one electricity storage device 2010 may be contained within the at least one electronic device 2012. One or both of electricity storage device 2010 and electronic device 2012 may be oriented on inner surface 2054. Alternatively, one or both of electricity storage device 2010 and electronic device 2012 may be embedded between any of the contiguous layers of material that may make up tire 2008, during the manufacturing of tire 2008, such layers including without limitation: an innerliner, a body ply, a bead filler, a gum strip, a shoulder insert, a belt, a cap ply, a tread, and a sidewall ply. It is understood that tire construction can vary greatly, and that the list above is neither intended to be exhaustive, nor inclusive, of every possible material layer within a tire.

Figure 21:
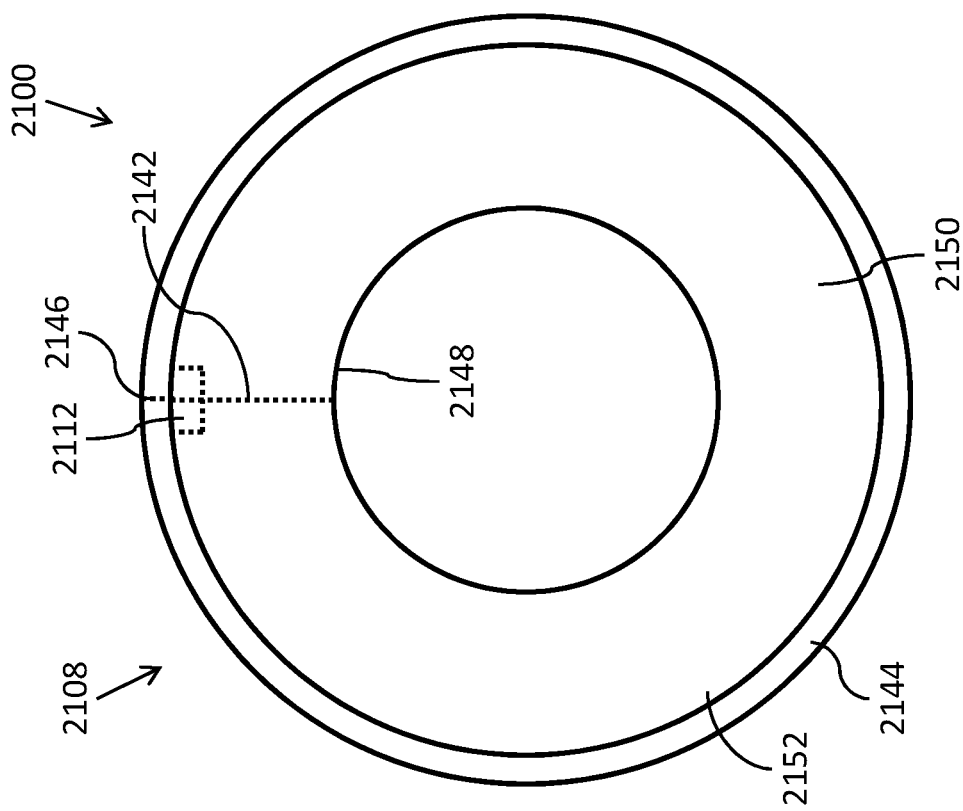
FIG. 21 illustrates an elevational view of a system 2100 for harvesting energy for an electronic device 2112 in a tire 2108.

FIG. 21 illustrates a system 2100 for harvesting energy for an electronic device 2112 in a tire 2108.

Tire 2108 includes a pair of bead portions 2148, a pair of sidewalls 2150, a pair of shoulders 2152, and a tread 2144.

At least one conductive element 2142 extends from at least one bead portion 2148, along at least one sidewall 2150, along at least one shoulder 2152, and into a tread region within which tread 2144 is oriented. At least one conductive element 2142 is electrically connected to at least one electronic device 2112. At least one electronic device 2112 may be electrically connected to at least one electricity storage device and a ground path 2146. Ground path 2146 extends through tread 2144 to provide an electrical path to a ground. In operation, tread 2144 of tire 2108 contacts the ground, and ground path 2146 likewise contacts the ground to permit the transmission of electricity to the ground. Ground path 2146 may extend through the entire thickness of tire 2108 in tread region 2155, from inner surface 2154 to a contact patch of tread 2144 on an exterior surface of tire 2108.

Conductive element 2142 may be oriented at a specific circumferential position in tire 2108. Conductive element 2142 may be a circumferentially short length. Conductive element 2142 may include a wire, or other conductive material such as antenna.

Electronic device 2112 may be oriented on an inner surface of tire 2108. Alternatively, electronic device 2112 may be embedded between any of the contiguous layers of material that may make up tire 2108, during the manufacturing of tire 2108, such layers including without limitation: an innerliner, a body ply, a bead filler, a gum strip, a shoulder insert, a belt, a cap ply, a tread, and a sidewall ply. It is understood that tire construction can vary greatly, and that the list above is neither intended to be exhaustive, nor inclusive, of every possible material layer within a tire.

Figure 22:
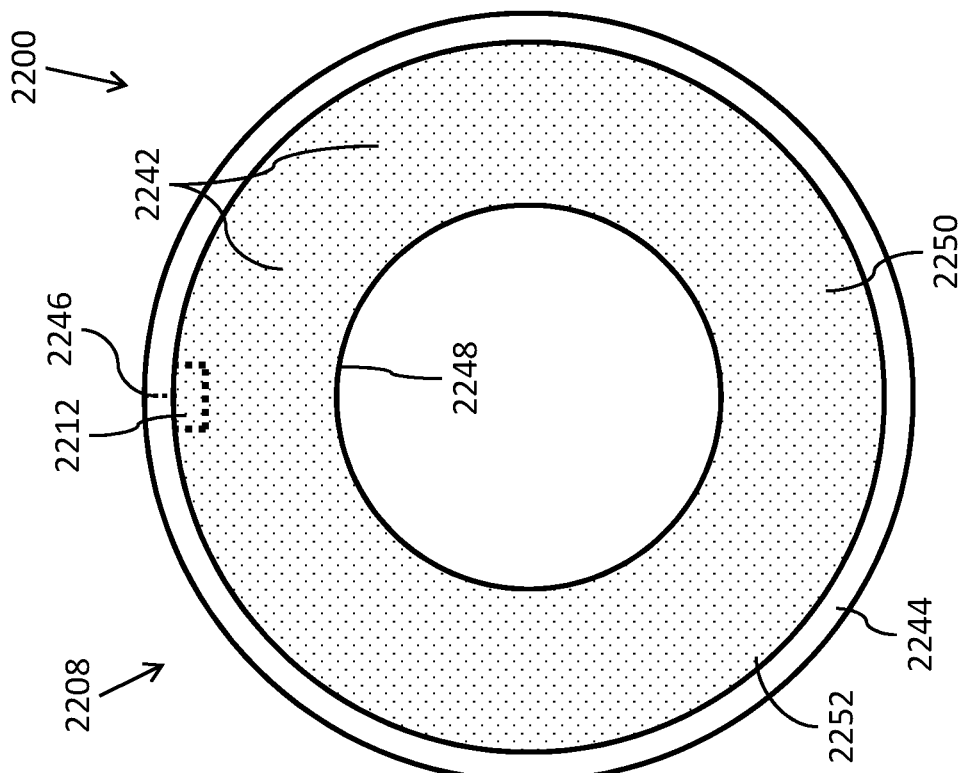
FIG. 22 illustrates an elevational view of a system 2200 for harvesting energy for an electronic device 2212 in a tire 2208.

FIG. 22 illustrates an elevational view of a system 2200 for harvesting energy for an electronic device 2212 in a tire 2208.

Tire 2208 includes a pair of bead portions 2248, a pair of sidewalls 2250, a pair of shoulders 2252, and a tread 2244.

At least one conductive element 2242 extends from at least one bead portion 2248, along at least one sidewall 2250, along at least one shoulder 2252, and into a tread region within which tread 2244 is oriented. At least one conductive element 2242 is electrically connected to at least one electronic device 2212. At least one electronic device 2212 may be electrically connected to at least one electricity storage device and a ground path 2246. Ground path 2246 extends through tread 2244 to provide an electrical path to a ground. In operation, tread 2244 of tire 2208 contacts the ground, and ground path 2246 likewise contacts the ground to permit the transmission of electricity to the ground. Ground path 2246 may extend through the entire thickness of tire 2208 in tread region 2255, from inner surface 2254 to a contact patch of tread 2244 on an exterior surface of tire 2208.

Conductive element 2242 may be oriented completely circumferentially in tire 2208. Conductive element 2242 may extend along the entire circumferential length of tire 2208. Conductive element 2242 may include a wire mesh, or other conductive material such as a sheet of antenna.

Electronic device 2212 may be oriented on an inner surface of tire 2208. Alternatively, electronic device 2212 may be embedded between any of the contiguous layers of material that may make up tire 2208, during the manufacturing of tire 2208, such layers including without limitation: an innerliner, a body ply, a bead filler, a gum strip, a shoulder insert, a belt, a cap ply, a tread, and a sidewall ply. It is understood that tire construction can vary greatly, and that the list above is neither intended to be exhaustive, nor inclusive, of every possible material layer within a tire.

Figure 23:
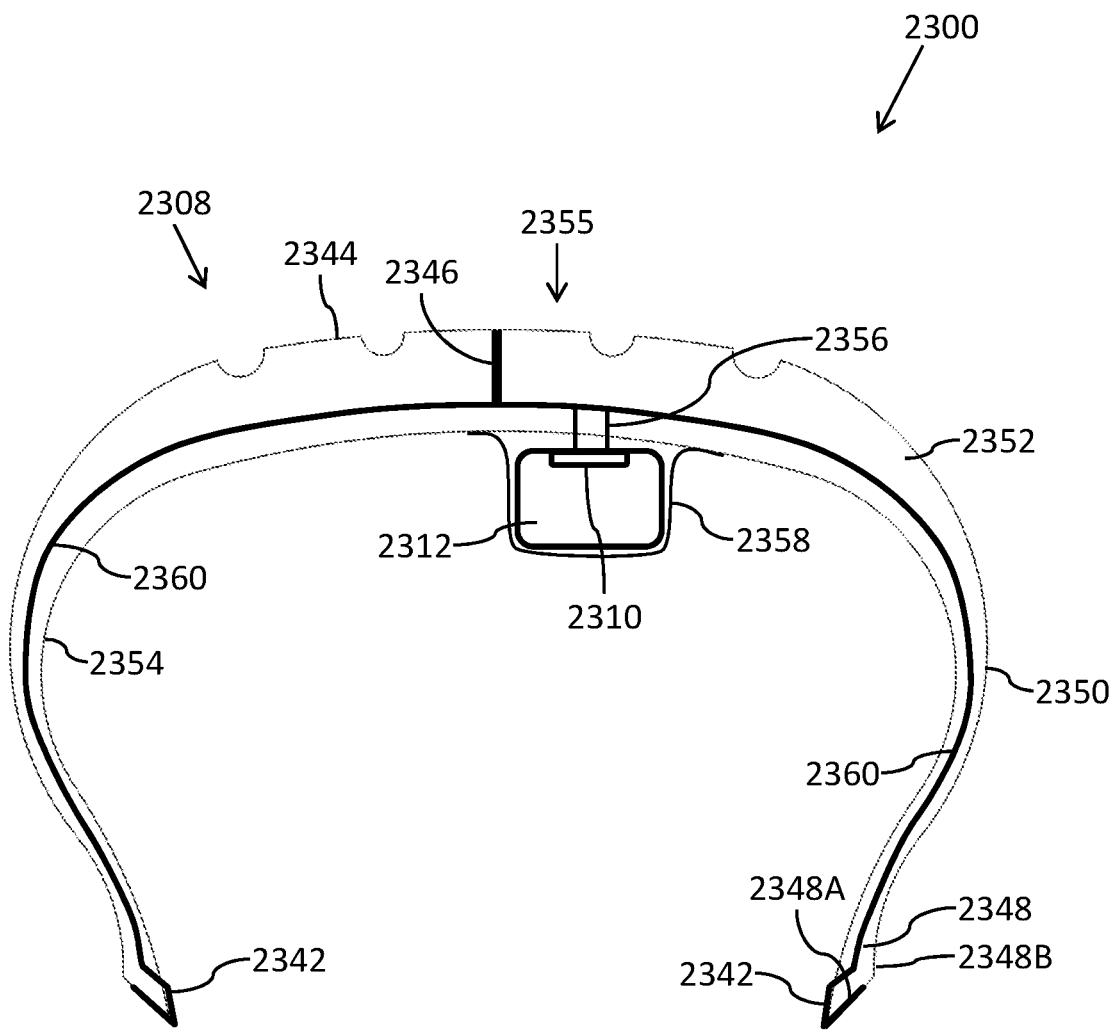
FIG. 23 illustrates a sectional view of a system 2300 for harvesting energy for an electronic device 2312 in a tire 2308.

FIG. 23 illustrates a sectional view of a system 2300 for harvesting energy for an electronic device 2312 in a tire 2308.

Tire 2308 includes a pair of bead portions 2348, a pair of sidewalls 2350, a pair of shoulders 2352, and a tread 2344 that is located in a tread region 2355. Tire 2308 includes an inner surface 2354. Tire 2308 may include at least one metallic cord 2360, which may be oriented in at least one of sidewalls 2350.

Each bead portion 2348 includes a bead seat 2348A and a bead heel 2348B. One or more conductive element 2342 may extend along at least part of one or each bead portion 2348. One or more conductive element 2342 may originate at bead seat 2348A. One or more conductive element 2342 may originate at bead heel 2348B. At or near bead portion 2348, or at or near sidewall 2350, or at or near shoulder 2352, conductive element 2342 pierces inner surface 2354 and extends into the interior of tire 2308 (the interior being defined as within the thickness of sidewalls 2350, shoulders 2352, and tread region 2355, and between the inner and outer surfaces of those elements). Conductive element 2342 may pierce into the interior of tire 2308 and electrically connect to metallic cord 2360.

Metallic cord 2360 may be used in a body ply of certain tires. For example, tires designed for high loads, including for example some off-the-road tires, some or all truck and bus radial tires, and some agricultural tires, may include metallic cords 2360 in body plies of tire 2308.

Metallic cord 2360 may be electrically conductive and may be capable of carrying electricity from conductive element 2342 to at least one of electricity storage device 2310 and electronic device 2312. Electricity may pass from metallic cord 2360 into at least one of electricity storage device 2310 and electronic device 2312 by conductive bridge 2356. Conductive bridge 2356 may pass through inner surface 2354 of tire 2308 and electrically connect to metallic cord 2360. Conductive bridge 2356 may include one or more metallic pin, wire, nail, or the like. Conductive bridge 2356 may be capable of carrying electrical current.

At least one of electricity storage device 2310 and electronic device 2312 may include an occlusive barrier 2358 configured to cover at least one of electricity storage device 2310 and electronic device 2312 and prevent air from inside tire 2308 through the perforation created by conductive bridge 2356. Occlusive barrier 2358 may seal against, and be connected to, inner surface 2354. Occlusive barrier 2358 may be made of a butyl rubber compound, which may be specifically designed to prevent or reduce the passage of atmospheric air therethrough.

Electricity in excess of that required to power one or more electronic device 2312 from electricity storage device 2310 may pass to a ground through a ground path 2346 in tread 2344. Ground path 2346 may electrically connect to metallic cord 2360. Ground path 2346 may directly electrically connect to electronic device 2312. Ground path 2346 may directly electrically connect to electricity storage device 2310. Ground path 2346, like the conductive elements described herein, may be any variety of materials capable of conducting electricity, including antenna. In one aspect, ground path 2346 is antenna. The ground may be earth, a road surface, or any surface upon which tire 2308 operates that is connected to the earth. In operation, tread 2344 of tire 2308 contacts the ground, and ground path 2346 likewise contacts the ground to permit the transmission of electricity to the ground. Ground path 2346 may extend through the entire thickness of tire 2308 in tread region 2355, from inner surface 2354 to a contact patch of tread 2344 on an exterior surface of tire 2308.

One or both of electricity storage device 2310 and electronic device 2312 may be oriented on inner surface 2354. Alternatively, one or both of electricity storage device 2310 and electronic device 2312 may be embedded between any of the contiguous layers of material that may make up tire 2308, during the manufacturing of tire 2308, such layers including without limitation: an innerliner, a body ply, a bead filler, a gum strip, a shoulder insert, a belt, a cap ply, a tread, and a sidewall ply. It is understood that tire construction can vary greatly, and that the list above is neither intended to be exhaustive, nor inclusive, of every possible material layer within a tire.

Figure 24:
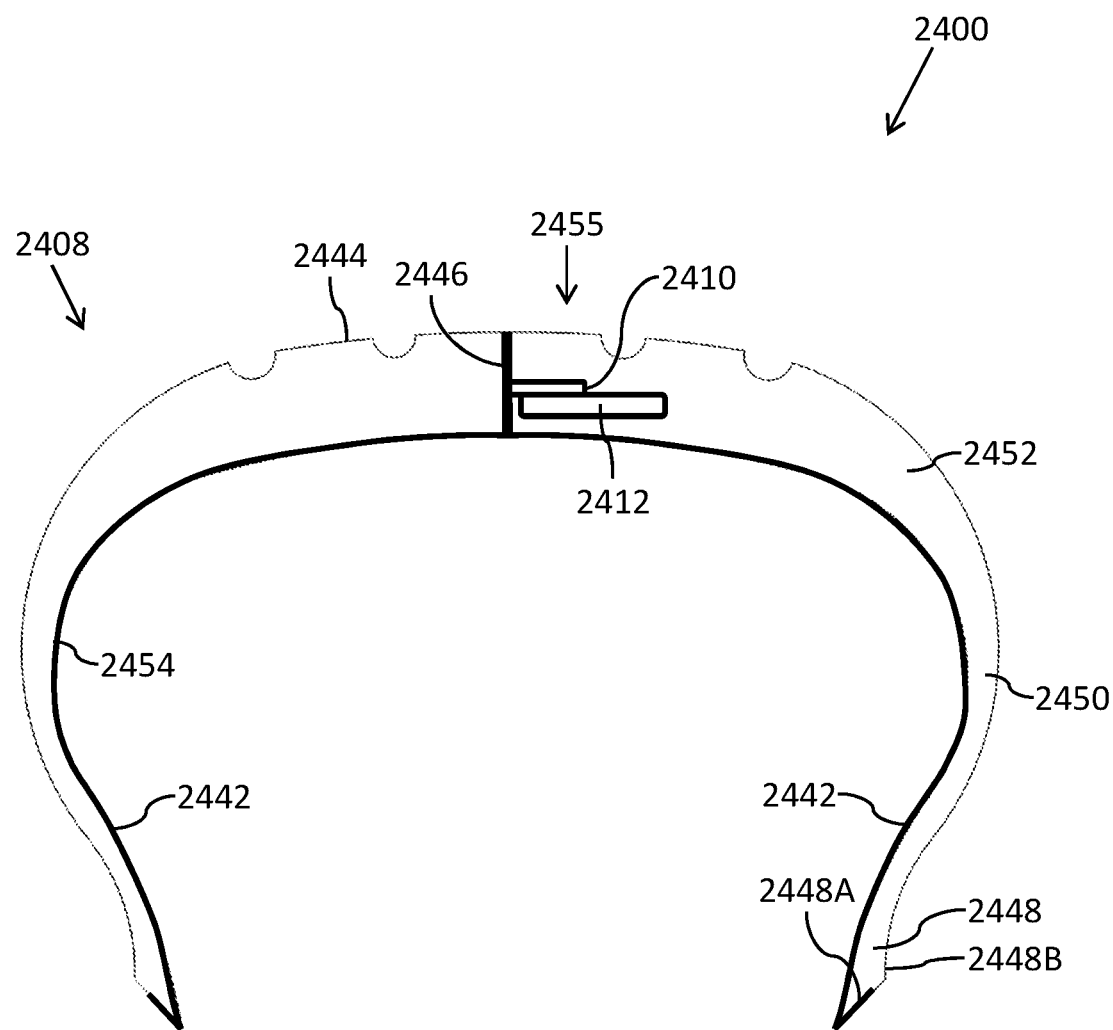
FIG. 24 illustrates a sectional view of a system 2400 for harvesting energy for an electronic device 2412 in a tire 2408.

FIG. 24 illustrates a sectional view of a system 2400 for harvesting energy for an electronic device 2412 in a tire 2408.

Tire 2408 includes a pair of bead portions 2448, a pair of sidewalls 2450, a pair of shoulders 2452, and a tread 2444 that is located in a tread region 2455. Tire 2408 includes an inner surface 2454.

Each bead portion 2448 includes a bead seat 2448A and a bead heel 2448B. One or more conductive element 2442 may extend from one or each bead portion 2448, along one or each sidewall 2450, along one or each shoulder 2452, and into tread region 2455. The one or more conductive element 2442 is oriented upon inner surface 2454. Each of the one or more conductive elements 2442 may originate at each bead seat 2448A. Each of the one or more conductive elements 2442 may originate at one or each bead heel 2448B, and extend along one or each bead seat 2448A and along one or each sidewall 2450, and so on until it reaches tread region 2455.

System 2400 may include at least one electricity storage device 2410 and at least one electronic device 2412. The at least one conductive element 2442 is electrically connected to at least one electricity storage device 2410. At least one electricity storage device 2410 is electrically connected to at least one electronic device 2412. At least one conductive element 2442 may be electrically connected to at least one electricity storage device 2410 via a ground path 2446.

Electricity in excess of that required to power one or more electronic device 2412 from electricity storage device 2410 may pass to a ground through ground path 2446 in tread 2444. Ground path 2446, like the conductive elements described herein, may be any variety of materials capable of conducting electricity, including antenna. In one aspect, ground path 2446 is antenna. The ground may be earth, a road surface, or any surface upon which tire 2408 operates that is connected to the earth. In operation, tread 2444 of tire 2408 contacts the ground, and ground path 2446 likewise contacts the ground to permit the transmission of electricity to the ground. Ground path 2446 may extend through the entire thickness of tire 2408 in tread region 2455, from inner surface 2454 to a contact patch of tread 2444 on an exterior surface of tire 2408.

One or both of electricity storage device 2410 and electronic device 2412 may be embedded between any of the contiguous layers of material that may make up tire 2408, during the manufacturing of tire 2408, such layers including without limitation: an innerliner, a body ply, a bead filler, a gum strip, a shoulder insert, a belt, a cap ply, a tread, and a sidewall ply. That is, one or both of electricity storage device 2410 and electronic device 2412 may be oriented within the thickness of tire 2408, between inner surface 2454 and an outer surface, such as a contact patch of tread 2444. One or both of electricity storage device 2410 and electronic device 2412 may be oriented in a variety of points within tire 2408 that do not compromise the structural integrity of tire 2408, as long as one or both of electricity storage device 2410 and electronic device 2412 are electrically connected to at least one conductive element 2442 and ground path 2446. It is understood that tire construction can vary greatly, and that the list above is neither intended to be exhaustive, nor inclusive, of every possible material layer within a tire.

Any of the tire treads described herein may largely comprise a nonconductive material, such as silica, which typically has a higher electrical resistance than other rubber elements in a tire. This is because tire treads are designed for specific purposes within the entirety of the tire, and the materials most commonly used for the tire tread are nonconductive and have high electrical resistance.

Generally, nonconductive tire materials are those comprising an electrical resistivity that prevents discharge of built up electricity in a vehicle at a rate sufficient to avoid negative effects of electricity build up in the vehicle. In one embodiment, nonconductive materials are materials comprising an electrical resistivity of about $10^{11}$ Ω·cm or greater. In another embodiment, nonconductive materials are materials comprising an electrical resistivity of about $10^9$ Ω·cm or greater.

Generally, conductive tire materials are those comprising an electrical resistivity that permits discharge of built up electricity in a vehicle at a rate sufficient to avoid negative effects of electricity build up in the vehicle. These conductive materials may be rubber or polymer materials used for any of the conductive elements (e.g., conductive elements 1542, 1842, 1942, 2042, 2142, 2242, 2342, and 2442), any of the ground paths (e.g., ground paths 1646, 2046, 2146, 2246, 2346, and 2446). These conductive materials may be rubber or polymer materials referred to herein as "antenna."

Any of the ground paths, (e.g., ground paths 1646, 2046, 2146, 2246, 2346, and 2446) may be oriented at one or more specific circumferential point in the tread (e.g., at a point radially outwardly from an electronic device), or may be oriented circumferentially about the entirety of the tread.

As used herein, the inner surface of the tire refers to that surface of the tire that is radially-inwardly facing, axially-inwardly facing, or both.

In one embodiment, conductive materials are materials comprising an electrical resistivity of about $10^9$ Ω·cm or less. In another embodiment, conductive materials are materials comprising an electrical resistivity of about $10^8$ Ω·cm or less. In another embodiment, conductive materials are materials comprising an electrical resistivity of about $10^6$ Ω·cm or less. In another embodiment, conductive materials are materials comprising an electrical resistivity of between about $10^5$ Ω·cm and about $10^9$ Ω·cm. In another embodiment, conductive materials are materials comprising an electrical resistivity of between about $10^5$ Ω·cm and about $10^8$ Ω·cm. In another embodiment, conductive materials are materials comprising an electrical resistivity of between about $10^5$ Ω·cm and about $10^6$ Ω·cm. It is understood that where larger (from a volume standpoint) conductive materials are used, those conductive materials may be able to have a greater resistivity and achieve the desired transfer of electricity, whereas smaller conductive materials may require lesser resistivity to achieve the desired transfer of electricity.

In one embodiment, electrical resistivity of conductive and nonconductive materials is determined using a volume resistivity test. In another embodiment, electrical resistivity of conductive and nonconductive materials is determined using an ASTM D991 test.

In another embodiment, electrical resistivity of conductive and nonconductive materials may be determined using a test including a probe, a test fixture, a resistance/current meter, a thermo-hygrometer, and a thickness gauge capable of reading to 0.001 inches (0.0254 mm). A test sample of a conductive or nonconductive material may have dimensions of about 6.0 inches (152.40 mm) by 6.0 inches (152.40 mm), by 0.1 inch (2.5400 mm). The test sample's thickness may be measured to the nearest 0.001 inch (0.0254 mm) in two places, which may be about 2.0 inches (50.800 mm) from the test sample's edge, along a line bisecting the test sample. The test sample's edges referenced in the measurement of thickness may be adjacent to one another and approximately 90 degrees to one another. The test sample is laid on a table for at least 1.0 hour at room temperature prior to taking resistivity measurements. The test sample may be oriented in the test apparatus such that the test sample's edge is aligned with the edge of a conductive plate, which conductive plate is connected via a probe to the resistance meter, all of which is below the test sample. The remaining three sides of the test sample may hang over the edges of the conductive plate evenly. A second probe may be connected to an input of the resistance meter, and may be placed on the top of the test sample, such that it is approximately on center with the conductive plate oriented beneath the test sample. Following placement of the test sample and probes in the test fixture, electrical resistivity may be measured via the resistance meter. In one embodiment, the probe and test fixture are verified prior to testing a test sample's resistivity.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in tire manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A system for powering an electronic device within a vehicle tire, comprising:
   an electrical energy generator;
   an electrically conductive vehicle wheel coated in a non-conductive coating, the vehicle wheel including a pair of rim lips, wherein at least one of the pair of rim lips includes a conductive area;
   the vehicle tire including a pair of bead portions, a pair of sidewalls, a pair of shoulders, a tread oriented in a tread region, and an inner surface;
   at least one conductive element extending from at least one of the pair of bead portions, and in contact with the inner surface along at least one of the pair of sidewalls, along at least one of the pair of shoulders, and terminating in the tread region;
   at least one electronic device within the vehicle tire; and
   at least one ground path extending through a thickness of the vehicle tire from the inner surface to an exterior surface in a contact patch of the tread;
   wherein the electrical energy generator is electrically connected to the electrically conductive vehicle wheel;
   wherein the at least one electronic device is electrically connected to the at least one conductive element and the at least one ground path; and
   wherein the at least one conducive element contacts the conductive area.

2. The system of claim 1, further comprising an electricity storage device electrically connected to the at least one conductive element and the at least one ground path.

3. The system of claim 1, wherein the at least one conductive element is a conductive rubber material oriented in a strip, extending radially from at least one of the pair of bead portions, in contact with the inner surface, and terminating in the tread region.

4. The system of claim 1, wherein the at least one conductive element is a conductive rubber material oriented in a sheet, extending radially from at least one of the pair of bead portions, in contact with the entirety of the inner surface, and terminating in the tread region.

5. The system of claim 1, wherein the conductive area is a portion of the rim lip where the non-conductive coating has been removed.

6. The system of claim 5, wherein the conductive area is oriented completely circumferentially about the rim lip.

7. The system of claim 5, wherein the conductive area is oriented at a single circumferential point on the rim lip.

8. The system of claim 5, further comprising a conductive coating covering the conductive area.

9. The system of claim 5, further comprising a conductive cover covering the conductive area.

10. The system of claim 5, further comprising a non-conductive cover covering the conductive area and a conductor oriented between the non-conductive cover and the conductive area.

11. A system for powering an electronic device within a vehicle tire, comprising:
    an electrical energy generator;
    an electrically conductive vehicle wheel coated in a non-conductive coating, the vehicle wheel including a pair of rim lips, wherein at least one of the pair of rim lips includes a conductive area;
    the vehicle tire including a pair of bead portions, a pair of sidewalls, a pair of shoulders, a tread oriented in a tread region, an inner surface, and a metallic cord oriented within an interior of the tire;
    at least one conductive element extending from at least one of the pair of bead portions and piercing into the interior of the tire and electrically connecting to the metallic cord;
    at least one electronic device within the vehicle tire; and
    at least one ground path extending through a thickness of the vehicle tire from the inner surface to an exterior surface in a contact patch of the tread;
    wherein the electrical energy generator is electrically connected to the electrically conductive vehicle wheel;
    wherein the at least one electronic device is electrically connected to the metallic cord and the at least one ground path; and
    wherein the at least one conducive element contacts the conductive area.

12. The system of claim 11, further comprising an electricity storage device electrically connected to the at least one conductive element and the at least one ground path.

13. The system of claim 11, wherein the conductive area is a portion of the rim lip where the non-conductive coating has been removed.

14. The system of claim 13, wherein the conductive area is oriented completely circumferentially about the rim lip.

15. The system of claim 13, wherein the conductive area is oriented at a single circumferential point on the rim lip.

16. The system of claim 13, further comprising a conductive coating covering the conductive area.

17. The system of claim 13, further comprising a conductive cover covering the conductive area.

18. The system of claim 13, further comprising a non-conductive cover covering the conductive area and a conductor oriented between the non-conductive cover and the conductive area.

* * * * *